(12) United States Patent
Kong

(10) Patent No.: US 9,542,132 B2
(45) Date of Patent: Jan. 10, 2017

(54) STORAGE INFORMATION UPDATE METHOD, IMAGE FORMING APPARATUS, SYSTEM FOR MANAGING IMAGE FORMING APPARATUS, AND MOBILE DEVICE

(71) Applicant: Samsung Electronics Co., Ltd., Suwon-si (KR)

(72) Inventor: Young Kang Kong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/451,877

(22) Filed: Aug. 5, 2014

(65) Prior Publication Data

US 2015/0062625 A1 Mar. 5, 2015

Related U.S. Application Data

(60) Provisional application No. 61/870,369, filed on Aug. 27, 2013.

(30) Foreign Application Priority Data

Aug. 31, 2013 (KR) .................. 10-2013-0104545

(51) Int. Cl.
*G06F 3/12* (2006.01)
*H04N 1/00* (2006.01)
*G03G 15/00* (2006.01)

(52) U.S. Cl.
CPC ......... *G06F 3/1231* (2013.01); *G03G 15/5079* (2013.01); *G06F 3/1226* (2013.01); *G06F 3/1292* (2013.01); *H04N 1/00342* (2013.01); *G03G 2215/00092* (2013.01); *G03G 2215/00109* (2013.01); *H04N 2201/0096* (2013.01); *H04N 2201/3205* (2013.01)

(58) Field of Classification Search
None
See application file for complete search history.

(56) References Cited

U.S. PATENT DOCUMENTS

| | | | | |
|---|---|---|---|---|
| 2007/0086047 | A1* | 4/2007 | Oh ..................... | G03G 15/5066 358/1.15 |
| 2007/0216940 | A1* | 9/2007 | Kobayashi ................... | 358/1.15 |
| 2009/0262382 | A1* | 10/2009 | Nobutani ................ | H04L 12/10 358/1.15 |
| 2011/0315758 | A1* | 12/2011 | Shuman ............. | G03G 15/5079 235/375 |
| 2012/0182432 | A1* | 7/2012 | Okamoto et al. .......... | 348/207.1 |
| 2013/0027746 | A1* | 1/2013 | Sasase .......................... | 358/1.15 |
| 2013/0231051 | A1* | 9/2013 | Naruse ......................... | 455/41.2 |

(Continued)

*Primary Examiner* — Miya J Cato
(74) *Attorney, Agent, or Firm* — Staas & Halsey LLP

(57) ABSTRACT

A storage information update method, an image forming apparatus, a system for managing the image forming apparatus, and a mobile device are provided. The method is performed by an image forming apparatus to which at least one identification number is assigned, a storage configured to store the identification number of the image forming apparatus, and a terminal device communicable with the storage. The method includes acquiring, by the terminal device, the at least one identification number of the image forming apparatus and transmitting, by the terminal device, the received at least one identification number to the storage.

53 Claims, 17 Drawing Sheets

(56) References Cited

U.S. PATENT DOCUMENTS

| | | | |
|---|---|---|---|
| 2013/0250358 A1* | 9/2013 | Suzuki | 358/1.15 |
| 2013/0258381 A1* | 10/2013 | Sato | 358/1.13 |
| 2013/0260683 A1* | 10/2013 | Suzuki et al. | 455/41.1 |
| 2014/0355047 A1* | 12/2014 | Lee | G06F 3/1292 |
| | | | 358/1.15 |
| 2015/0278564 A1* | 10/2015 | Naruse | G06F 3/1292 |
| | | | 340/10.51 |

\* cited by examiner

STORAGE INFORMATION UPDATE METHOD, IMAGE FORMING APPARATUS, SYSTEM FOR MANAGING IMAGE FORMING APPARATUS, AND MOBILE DEVICE

CROSS-REFERENCE TO RELATED APPLICATIONS

This application claims the priority benefit of U.S. Patent Application Ser. No. 61/870,369, filled on Aug. 27, 2013 in the U.S. Patent and Trademark Office, the disclosure of which is incorporated herein by reference. This application claims the priority benefit of Korean Patent Application No. 10-2013-104545, filed on Aug. 31, 2013 in the Korean Intellectual Property Office, the disclosure of which is incorporated herein by reference.

BACKGROUND

1. Field

Embodiments relate to a storage information update method, an image forming apparatus, a system for managing the image forming apparatus, and a mobile device.

2. Description of the Related Art

An image forming apparatus is an apparatus capable of printing a predetermined image on a printing medium such as printing paper. Such an image forming apparatus, for example, is a printer, a copy machine, a facsimile device, or the like. A multifunctional device implemented by integrating some or all functions of the printer, the copy machine, the facsimile device, etc., may also be an example of the image forming apparatus. The image forming apparatus is an inkjet type image forming apparatus which prints a predetermined image on a printing medium by ejecting ink of minute liquid droplets to a desired position on the printing medium, an electro-photographic type image forming apparatus which supplies toner to an electrostatic latent image generated by radiating light to a photosensitive body, or the like and prints a predetermined image by transferring the electrostatic latent image to which the toner is supplied onto the printing medium. The image forming apparatus may receive an image or the like desired to be printed from an information processing apparatus such as a personal computer (PC) or a mobile communication apparatus using a wired or wireless communication network, and print the received image on the printing medium.

SUMMARY

In an aspect of one or more embodiments, there is provided a storage information update method, an image forming apparatus, a system for managing the image forming apparatus, and a mobile device so that an identification number of an image forming apparatus stored in a separate storage may be easily updated even when the identification number of the image forming apparatus is changed when the identification number of the image forming apparatus is stored in the separate storage.

In an aspect of one or more embodiments, there are provided a storage information update method, an image forming apparatus, a system for managing the image forming apparatus, and a mobile device.

In an aspect of one or more embodiments, there is provided a system for managing an image forming apparatus, including: the image forming apparatus to which at least one identification number is assigned; a storage configured to store an identification number of the image forming apparatus; and a terminal device configured to receive at least one identification number from the image forming apparatus when the identification number assigned to the image forming apparatus is different from the identification number stored in the storage and transmit the received at least one identification number to the storage.

The terminal device may be connectable to at least one of the imaging forming apparatus and the storage through at least one communication network of a wired communication network and a wireless communication network. In this case, the wireless communication network may use at least one scheme of a radio frequency (RF) identifier (RFID) scheme, a near field communication (NFC) scheme, a wireless fidelity (Wi-Fi™) scheme, a Wi-Fi Direct™ scheme, and a Bluetooth™ scheme.

The at least one identification number may include at least one of a media access control (MAC) address, an Internet protocol (IP) address, and a personal identification number (PIN) code of the image forming apparatus.

The storage may include an electronic tag. In this case, the terminal device may include an electronic tag reader configured to read information stored in the electronic tag.

The terminal device may receive at least one identification number from the storage and communicate with the image forming apparatus using the received at least one identification number.

At least one of the terminal device and the storage may generate an RF field for performing communication between the storage and the terminal device.

The terminal device may search for at least one image forming apparatus using a wireless communication network and determine whether to connect to the searched image forming apparatus using at least one identification number of the searched at least one image forming apparatus.

The terminal device may include at least one of a cellular phone, a smartphone, a tablet PC, a notebook computer, a PC, and a personal digital assistant (PDA).

In the system, the image forming apparatus may send a connection request signal to the terminal device, and the image forming apparatus may transmit the at least one identification number to the terminal device when the terminal device accepts the connection request of the image forming apparatus.

The image forming apparatus may include a display unit configured to display the at least one identification number, and the terminal device may directly receive a changed identification number of the image forming apparatus according to an operation of a user.

The image forming apparatus may print the at least one identification number.

The system may further include: an information processing apparatus connected to the image forming apparatus through a wired/wireless communication network and configured to store at least one identification number assigned to the image forming apparatus.

In one or more embodiments, the information processing apparatus may transmit the at least one identification number to the terminal device when the identification number of the image forming apparatus is changed.

The information processing apparatus may transmit at least one identification number to the terminal device using a terminal device identification number for identifying the terminal device.

In one or more embodiments, the terminal device identification number may be a telephone number or an electronic mail address assigned to the terminal device.

The information processing apparatus may be connected to the image forming apparatus using an IP address of the image forming apparatus.

The image forming apparatus may receive a terminal device identification number for identifying the terminal device from at least one information processing apparatus connected to the image forming apparatus and transmit the at least one identification number to the terminal device using the terminal device identification number.

The terminal device includes a barcode reader configured to read a one- or two-dimensional barcode. In this case, the one- or two-dimensional barcode may store information about the at least one identification number.

The image forming apparatus may include a Wi-Fi™ protected setup (WPS) input unit, and the WPS input unit may be a physical button formed on the image forming apparatus or a virtual button displayed on a touch screen.

In an aspect of one or more embodiments, there is provided a mobile device including: an input unit configured to receive at least one identification number when at least one identification number of an image forming apparatus is changed; and a communication unit configured to transmit the at least one identification number to an electronic tag capable of storing the identification number of the image forming apparatus. In this case, the input unit may receive the at least one identification number using a wired or wireless communication network.

In an aspect of one or more embodiments, there is provided a storage information update method to be performed by an image forming apparatus to which at least one identification number is assigned, a storage configured to store the identification number of the image forming apparatus, and a terminal device communicable with the storage, the method including: acquiring, by the terminal device, the at least one identification number of the image forming apparatus; and transmitting, by the terminal device, the received at least one identification number to the storage.

The terminal device may be connectable to at least one of the imaging forming apparatus and the storage through at least one communication network of a wired communication network and a wireless communication network. In this case, the wireless communication network may use at least one scheme of an RFID scheme, an NFC scheme, a Wi-Fi™ scheme, a Wi-Fi Direct™ scheme, and a Bluetooth™ scheme.

The at least one identification number may include at least one of a MAC address, an IP address, and a PIN code of the image forming apparatus.

The storage may be an electronic tag. In this case, the storage information update method may further include: reading, by the terminal device, at least one identification number stored in the electronic tag and communicating with the image forming apparatus using the read at least one identification number.

The transmitting may include: generating, by at least one of the terminal device and the storage, an RF field and transmitting the received at least one identification number to the storage using the RF field.

The acquiring may include: searching for, by the terminal device, at least one image forming apparatus using a wireless communication network; determining, by the terminal device, whether to connect to the searched image forming apparatus using at least one identification number of the searched at least one image forming apparatus; and acquiring, by the terminal device, at least one identification number of the image forming apparatus according to the determination.

The acquiring may include: transmitting, by the image forming apparatus, a connection request signal to the terminal device; accepting, by the terminal device, a connection request; pairing the image forming apparatus and the terminal device; and transmitting, by the image forming apparatus, the at least one identification number to the terminal device.

The acquiring may include: displaying, by the image forming apparatus, the at least one identification number; and receiving, by the terminal device, the changed identification number of the image forming apparatus.

The acquiring may include: printing, by the image forming apparatus, the at least one identification number; and receiving, by the terminal device, the changed identification number of the image forming apparatus.

The image forming apparatus may include a storage unit configured to store a terminal device identification number for identifying the terminal device. In this case, the acquiring may include transmitting, by the image forming apparatus, the at least one identification number to the terminal device using the terminal device identification number.

The acquiring may include reading, by the terminal device, a one- or two-dimensional barcode in which information about the at least one identification number is stored.

The acquiring may include: receiving, by a WPS input unit formed in the image forming apparatus, an operation start command; recognizing, by the image forming apparatus, the terminal device according to the operation start command; and transmitting, by the image forming apparatus, at least one identification number to the terminal device.

In one or more embodiments, the WPS input unit is a physical button or a touch screen module formed on the image forming apparatus.

In an aspect of one or more embodiments, there is provided a storage information update method to be performed by an image forming apparatus to which at least one identification number is assigned, a storage configured to store the identification number of the image forming apparatus, a terminal device communicable with the storage, and an information processing apparatus connected to the image forming apparatus through a wireless or wireless communication network.

The information updating method may include: acquiring, by the information processing apparatus, the at least one identification number of the image forming apparatus; transmitting, by the information processing apparatus, the at least one identification number to the terminal device; and transmitting, by the terminal device, the received at least one identification number to the storage.

Transmitting, by the information processing apparatus, the at least one identification number to the terminal device may include transmitting, by the information processing apparatus, the at least one identification number to the terminal device using a terminal device identification number for identifying the terminal device. In one or more embodiments, the terminal device identification number may be a telephone number or an electronic mail address assigned to the terminal device.

The acquiring may include: establishing, by the information processing apparatus, a connection to the image forming apparatus using an IP address of the image forming apparatus; and acquiring the at least one identification number of the image forming apparatus from the connected image forming apparatus.

In an aspect of one or more embodiments, there is provided an image forming apparatus including: a housing; a first storage unit installed outside the housing and configured to store at least one identification number of the image forming apparatus; and a second storage unit installed inside the housing and configured to store at least one identification number of the image forming apparatus, wherein, when the identification number stored in the first storage unit is different from the identification number assigned to the image forming apparatus stored in the second storage unit, the identification number stored in the first storage unit is caused to be consistent with the identification number assigned to the image forming apparatus stored in the second storage unit through at least one terminal device.

In one or more embodiments, the at least one identification number may include at least one of a MAC address, an IP address, and a PIN code of the image forming apparatus.

The first storage unit may include an electronic tag attachable outside the housing, and the at least one terminal device may transmit data to the electronic tag through a wired or wireless communication network.

The second storage unit may include a storage medium installed in a main board or a communication module of the image forming apparatus.

The at least one terminal device is connectable to at least one of the first storage unit and the second storage unit through at least one communication network of a wired communication network and a wireless communication network. In this case, when the identification number stored in the first storage unit is different from the identification number assigned to the image forming apparatus stored in the second storage unit, the at least one terminal device may update the at least one identification number stored in the first storage unit by delivering the at least one identification number received from the image forming device, stored in advance, or stored in the second storage unit received through an input unit included in the at least one terminal device to the first storage unit.

The image forming apparatus may further include: a communication unit connected to the at least one terminal device through at least one communication network of a wired communication network and a wireless communication network. In an embodiment, when the identification number of the image forming apparatus is changed, the communication unit may transmit the at least one identification number to the terminal device or a server device. In addition, the communication unit may transmit at least one identification number to the terminal device using a terminal device identification number for identifying the terminal device.

The image forming apparatus may further include at least one of: a display unit configured to display the at least one identification number; a print unit configured to print the at least one identification number; and a WPS input unit which is a physical button or a touch screen module formed in the image forming apparatus.

In addition, the image forming apparatus may further include: a barcode unit configured to store information about the at least one identification number, wherein the at least one terminal device delivers the information about the at least one identification number acquired from the barcode unit to the first storage unit and updates the at least one identification number stored in the first storage unit.

The terminal device may include at least one of a cellular phone, a tablet PC, a notebook computer, a PC, and a PDA.

In an aspect of one or more embodiments of a storage information update method, an image forming apparatus, a system for managing the image forming apparatus, and a mobile device as described above, it is possible to easily update an identification number of the image forming apparatus stored in a separate storage when a real identification number of the image forming apparatus is not consistent with the identification number of the image forming apparatus stored in the separate storage.

Even when the identification number of the image forming apparatus is changed by replacing or repairing a main board of the image forming apparatus, the real identification number of the image forming apparatus may be easily caused to be consistent with the identification number of the image forming apparatus stored in the storage.

Accordingly, when the terminal device such as a mobile communication device is connected to the image forming apparatus by acquiring a MAC address or a PIN code of the image forming apparatus from the storage, it is possible to prevent an inter-device communication failure because a changed MAC address or PIN code may be easily acquired even when the MAC address or PIN code of the image forming apparatus is changed.

Even when the main board of the image forming apparatus to which an NFC tag storing the MAC address or PIN code is attached is replaced, it is possible to again utilize a storage such as an existing NFC tag. Also, the number of replacements of the storage such as the NFC tag may be reduced and a replacement time may be shortened.

Even when the storage storing the MAC address or PIN code is attached to the image forming apparatus to which a different MAC address or PIN code is assigned, it is possible to prevent a failure of the image forming apparatus and the storage in advance because the MAC address or PIN code stored in the storage may be updated.

According to another aspect of one or more embodiments, there is provided at least one computer readable medium storing computer readable instructions that when executed control at least one processor to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
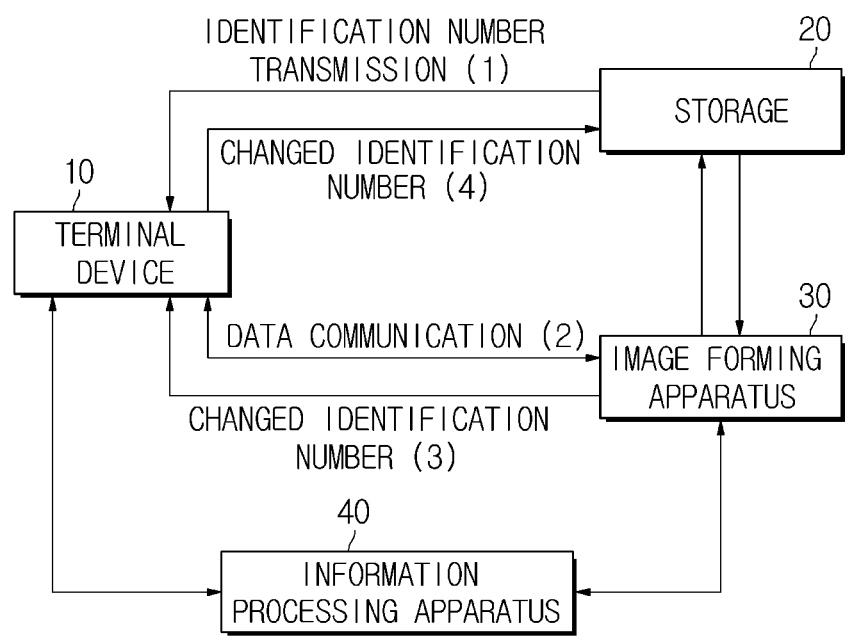
FIG. 1 is a configuration diagram illustrating an embodiment of a system for managing an image forming apparatus.

Reference will now be made in detail to embodiments, examples of which are illustrated in the accompanying drawings, wherein like reference numerals refer to the like elements throughout.

Hereinafter, a storage information update method and a method of managing an image forming apparatus will be described with reference to FIGS. 1 to 17.

Figure 2:
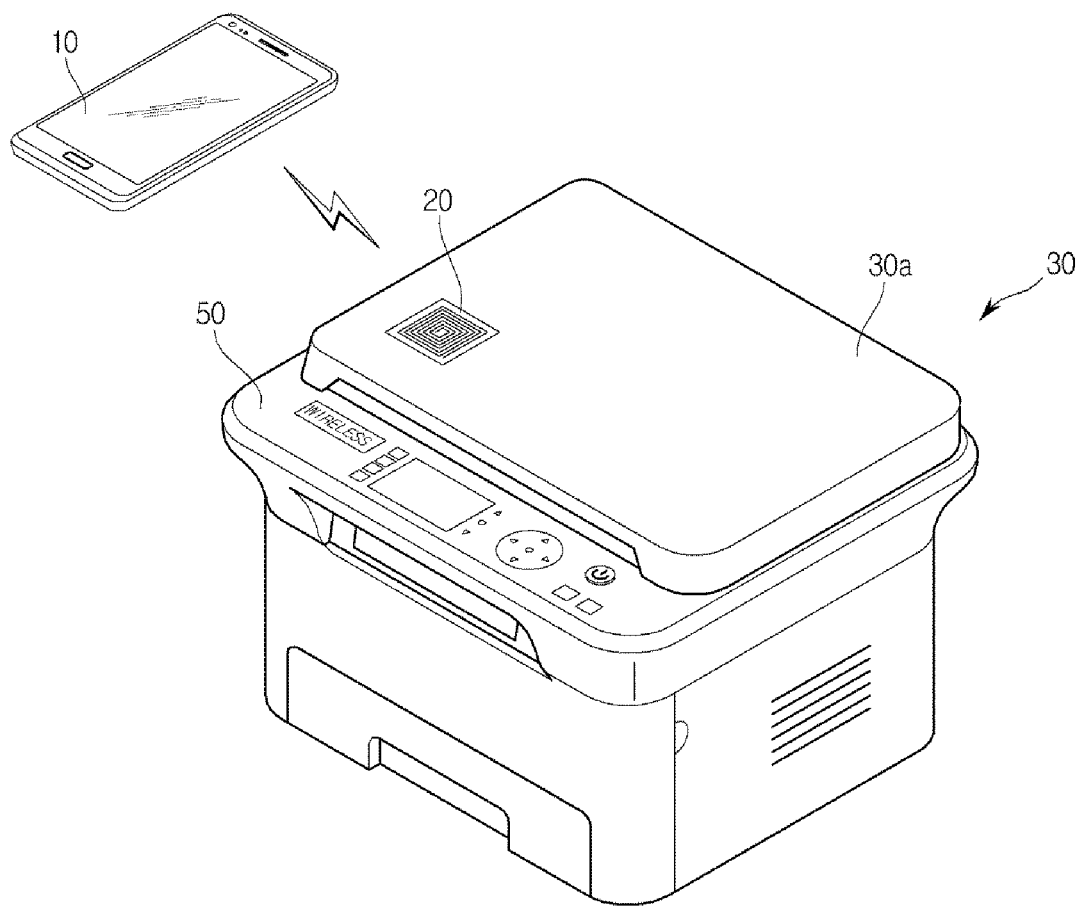
FIG. 2 is a diagram illustrating an embodiment of the system for managing the image forming apparatus.

FIG. 1 is a configuration diagram illustrating an embodiment of a system for managing an image forming apparatus, and FIG. 2 is a diagram illustrating an embodiment of the system for managing the image forming apparatus.

As illustrated in FIGS. 1 and 2, the system may include a terminal device 10, a storage 20, and an image forming apparatus 30.

The terminal device 10 may transmit or receive data using a wired or wireless communication network to or from at least one of the storage 20 and the image forming apparatus 30. In an embodiment, the wireless communication network may use at least one scheme of a radio frequency identifier (RFID) scheme, a Near Field Communication (NFC) scheme, a Wi-Fi™ scheme, a Wi-Fi Direct™ scheme, and a Bluetooth™ scheme.

The RFID scheme is a scheme of performing communication between an RFID tag and an RFID reader within a predetermined distance using various frequencies.

The NFC scheme is a scheme of enabling an electronic tag and an electronic tag reader to communicate with each other using electromagnetic waves at a frequency of 13.56 MHz. The NFC scheme is based on a standard of International Organization for Standardization (ISO) 13157. As the NFC scheme, there are an active communication scheme, a semi-passive communication scheme, and a passive communication scheme. The active communication scheme, the semi-passive communication scheme, and the passive communication scheme may be distinguished according to an operation of the electronic tag. In the active communication scheme, both the electronic tag and the electronic tag reader can perform communication by generating an RF field. In an embodiment, the electronic tag is operable by receiving power from outside. In the passive communication scheme, only the electronic tag reader generates the RF field and the electronic tag starts to be operated by the RF field generated by the electronic tag reader. In an embodiment, it is not necessary to apply power to the electronic tag and information may be recorded on or read from the electronic tag by using only power of the electronic tag reader. The semi-passive communication scheme is a scheme in which power supplied to the electronic tag is used when information of a semiconductor chip within the electronic tag is read or power of the electronic tag reader is used in the case of communication.

The Wi-Fi™ scheme is an Institute of Electrical and Electronics Engineers (IEEE) 802.11 standard-based communication scheme in which wireless communication may be performed between an access point (AP) and a device within a given range.

The Wi-Fi Direct™ scheme is a scheme of enabling communication to be directly performed between devices capable of wireless communication using a Wi-Fi™ scheme without involving the AP, and is based on the same IEEE 802.11 standard as in the Wi-Fi™

The Bluetooth™ scheme enables communication to be performed using electromagnetic waves at a frequency of 2.4 to 2.5 GHz. An example of a network standard for the Bluetooth™ scheme is IEEE 802.15.1.

According to an embodiment, the terminal device 10 can transmit and receive data to and from both the storage 20 and the image forming apparatus 30 using the wireless communication network. In an embodiment, the wireless communication network between the terminal device 10 and the storage 20 and the wireless communication network between the terminal device 10 and the image forming apparatus may use different wireless communication schemes. For example, communication between the terminal device 10 and the storage 20 may be performed using the NFC scheme and communication between the terminal device 10 and the image forming apparatus 30 may be performed using the Wi-Fi™ scheme or the Wi-Fi™ scheme.

The terminal device 10 may receive at least one identification number assigned from the storage 20 to the image forming apparatus 30 as indicated by reference sign (1). In an embodiment, the identification number assigned to the image forming apparatus 30 may be at least one of the MAC address, the IP address, and the PIN code of the image forming apparatus 30. For example, the terminal device 10 may receive the MAC address and the PIN code of the image forming apparatus 30 with which communication is desired from the storage 20.

The MAC address is an identification number used to identify various devices such as a computer and the image forming apparatus 30 on the network. More specifically, the MAC address may be a specific identification number assigned to a communication module of the computer or the image forming apparatus 30, for example, a local area network (LAN) card, or the like. The MAC address may be used to identify the computer or the image forming apparatus 30 on the network because computers or image forming apparatuses 30 manufactured by manufacturers are assigned to be different from each other. The MAC address, for example, may be 48-bit data including a number and a character. The MAC address may include an organization unique identifier (OUI) for indicating a vendor and a host identifier of a single manufacture. Because the MAC address is separately assigned for each communication module or main board, the MAC address of the device may be changed when the communication module or the main board within the device is replaced.

The IP address represents a special code on the network to be used to identify the computers or the image forming apparatuses 30 from each other on the network and perform communication. In a fourth version, the IP address may be generally represented by 32-bit data using four decimal numbers between 0 and 255. When inter-device communication is performed using a transmission control protocol (TCP)/IP, the IP address is converted into the above-described MAC address and the MAC address is used to perform the inter-device communication. Different from the MAC address, the IP address may not be changed even when the communication module or the main board within the device is replaced.

The PIN code is an identification number for permitting a connection of each device by authenticating the device when a plurality of devices perform wireless or wired communication with each other. The PIN code may be changed by the user.

Upon receiving at least one identification number for the image forming apparatus 30 from the storage 20, the terminal device 10 may identify and recognize the image forming apparatus 30 using the identification number for the image forming apparatus 30 and transmit or receive data to or from the identified and recognized image forming apparatus 30 using the wired or wireless communication network as indicated by reference sign (2). When the terminal device 10 is connected to the image forming apparatus 30 through the wired or wireless communication network, the terminal device 10 may transmit predetermined image or document data to the image forming apparatus 30. The image forming apparatus 30 may print the received predetermined image or document data on a printing medium.

According to an embodiment, the terminal device 10 may receive at least one identification number from the image forming apparatus 30 as indicated by reference sign (3). In an embodiment, the at least one identification number may be at least one changed identification number of the image forming apparatus 30. As described above, the identification number of the image forming apparatus may be changed according to the replacement of the main board or the like, and the terminal device 10 may receive the at least one changed identification number from the image forming apparatus 30 through various methods. The terminal device 10 delivers the received at least one changed identification number to the storage 20 using a predetermined communication network, for example, a wireless communication network using the NFC scheme as indicated by reference sign (4), and the storage may store the received at least one changed identification number.

The above-described terminal device 10, for example, may be a mobile device such as a cellular phone, a smartphone, or a tablet PC. In addition, the terminal device 10 may be a notebook computer, a PC, or a PDA. Also, a communication unit (communicator) capable of communicating predetermined data with the storage 20 and the image forming apparatus 30 and various devices having a control device or a memory device associated with the communication unit (communicator) may also be an example of the terminal device 10.

Figure 3:
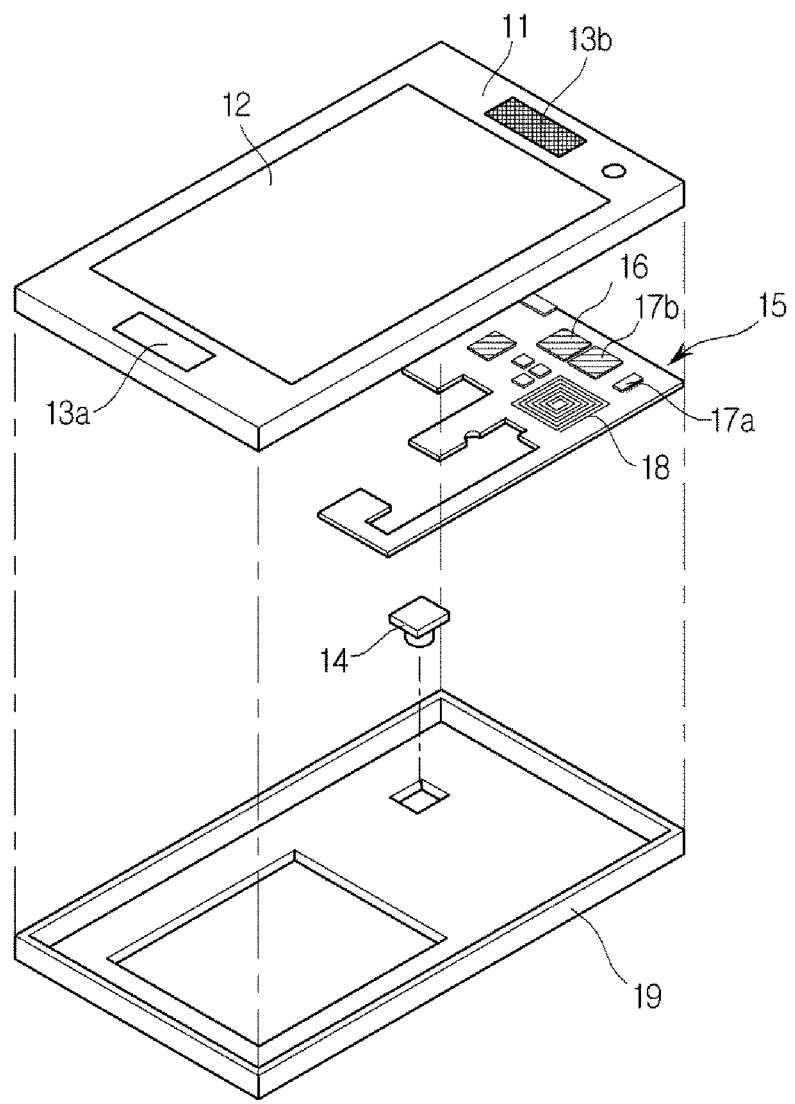
FIG. 3 is an exploded view illustrating an embodiment of a terminal device.

FIG. 3 is a diagram illustrating an embodiment in which the terminal device is a smartphone.

As illustrated in FIG. 3, the terminal device 10 may include a front-side housing 11 and a backside housing 19 capable of being coupled to the front-side housing 11.

A display unit 12 capable of displaying a predetermined image may be formed on the front-side housing 11. The display unit 12 may display an identification number of the image forming apparatus 30 received from the storage 20 or display a predetermined image or document to be transmitted to the image forming apparatus 30.

As the display unit 12, a predetermined display panel may be used to display a predetermined video. The display panel, for example, may be various types of display panels capable of generally displaying a video such as a liquid crystal display (LCD) panel, a plasma display panel (PDP), and an organic light emitting diode (OLED) panel. As the display unit 12, a touch screen panel which recognizes a touch operation of a user at a specific position on the panel and outputs an input signal may be used. In an embodiment, the display unit 12 may receive a predetermined instruction or command from the user according to the user's touch operation.

The display unit 12 may operate according to control of a central processing unit (CPU) or a graphic processing unit (GPU) of the terminal device 10 or the like. The CPU or GPU may be implemented by a semiconductor chip 16 or the like installed in a predetermined printed circuit board 15 coupled to the front-side housing 11 or the backside housing 19.

In the front-side housing 11, a predetermined physical button 13a for controlling the terminal device 10, a speaker 13b which outputs a predetermined sound, etc. may be formed.

The terminal device 10 may include at least one printed circuit board 15 fixed to at least one of the front-side housing 11 and the backside housing 19. In the printed circuit board 15, various semiconductor chips and wiring layers may be installed and formed. For example, the CPU chip 16 capable of controlling the overall operation of the terminal device 10 may be installed in the printed circuit board 15.

In the printed circuit board 15, a first communication chip 17a for communicating with the storage 20, a second communication chip 17b for communicating with the image forming apparatus 30, etc. may be installed. The first communication chip 17a and the second communication chip 17b may be integrated circuit (IC) chips. The communication chips 17a and 17b may control generation of various signals or demodulate or modulate signals.

According to an embodiment, the first communication chip 17a for communicating with the storage 20 may be a communication chip for performing NFC. In addition, the second communication chip 17b for communicating with the image forming apparatus 30 may be a communication chip capable of communication according to the Wi-Fi™ scheme or the Wi-Fi™ scheme.

According to an embodiment, on the printed circuit board 15, both the first communication chip 17a and the second communication chip 17b may be installed or only one communication chip capable of performing both functions of the first communication chip 17a and the second communication chip 17b may be installed.

On the printed circuit board 15, an antenna 18 capable of transmitting or receiving electromagnetic waves in a specific band may be installed. The antenna 18 may be used to perform wireless communication with the storage 20 or the image forming apparatus 30.

According to an embodiment, the antenna 18 may be used to perform NFC. As illustrated in FIG. 3, the antenna 18 may include a metallic plate having a spiral shape. The antenna 18 may be connected to a predetermined IC chip, for example, the first communication chip 17a.

When the storage 20 is the electronic tag, the terminal device 10 may include an electronic tag reader. The electronic tag reader may include a predetermined NFC chip, for example, the first communication chip 17a, and an antenna 18. The electronic tag may be any one of the RFID tag or the NFC tag.

The first communication chip 17a may generate a predetermined data transmission request signal and transmit the generated predetermined data transmission request signal to the electronic tag through the antenna 18. According to the data transmission request signal, the electronic tag may transmit information stored in the electronic tag through predetermined electromagnetic waves. The information stored in the electronic tag, for example, may be an identification number of the image forming apparatus 30. The antenna 18 receives predetermined electromagnetic waves and delivers a signal corresponding to the received electromagnetic waves to the first communication chip 17a, and thus the first communication chip 17a may acquire information stored in the electronic tag.

In addition, the first communication chip 17a may control predetermined information, for example, a changed identification number of the image forming apparatus 30, to be transmitted to the electronic tag through the antenna 18. The electronic tag may store the received predetermined information.

According to an embodiment, the terminal device 10 may further include a predetermined imaging module 14. The imaging module 14 may receive external light, for example, visible light or infrared light, and generate predetermined video data based on the received light. The imaging module 14 may include a lens which collects the external light and a charge-coupled device (CCD) which converts condensed light into electric charge after the collected light is condensed. According to an embodiment, a focus adjustment device for adjusting an interval between the lens and the CCD or the like may be further included.

The storage 20 illustrated in FIG. 1 may transmit and receive data to and from an external device, for example, the terminal device 10, through the wired or wireless communication network and store predetermined information. The storage 20 may store the identification number of the image forming apparatus 30.

The storage 20, for example, may be the electronic tag and, more specifically, may be the RFID tag or the NFC tag.

Figure 4:
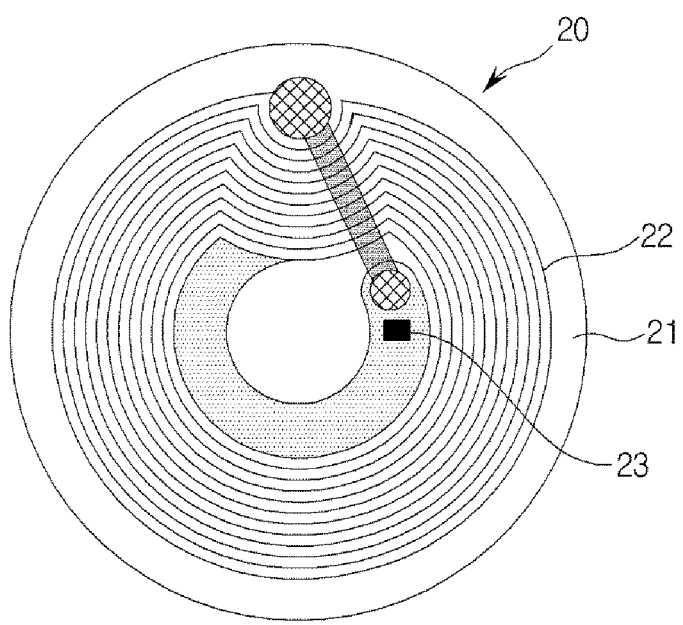
FIG. 4 is a plan view illustrating an embodiment of an NFC tag.

FIG. 4 is a plan view illustrating an embodiment of the NFC tag.

As illustrated in FIG. 4, the storage 20 may be the electronic tag including a substrate 21, an antenna 22, and an IC chip 23.

On at least one side of the substrate 21, the antenna 22 and the IC chip 23 may be arranged. The substrate 21 may be manufactured in various forms and materials. For example, as illustrated in FIG. 4, the substrate 21 may be circular, rectangular, or triangular.

The antenna 22 is a device for transmitting or receiving electromagnetic waves in a specific band. In the case of the NFC tag, the antenna 22 may be formed in a spiral shape on the one side of the substrate 21 as illustrated in FIG. 4. According to an embodiment, the antenna 22 may be a dipole antenna, a fractal antenna, or a meander line antenna.

The antenna 22 may have one end connected to the IC chip 23. The IC chip 23 may be an IC memory device and the IC memory device may store various information. In addition, the IC chip 23 may independently transmit and receive information stored in the external terminal device 10 or the like according to a state or a request of the electronic tag reader formed in the terminal device 10. According to an embodiment, the IC chip 23 may store the identification number of the image forming apparatus 30 to which the storage 20 is attached. The IC memory device, for example, may be an electrically erased programmable read only memory (EEPROM).

The substrate 21, the antenna 22, and the IC chip 23 may be packaged by a predetermined protective membrane to protect the substrate 21, the antenna 22, and the IC chip 23 from an external impact or a foreign substance.

On the protective membrane, an adhesive member for adhering the storage 20 to an external object may be formed. The adhesive member may be coated on the protective membrane or the like. The adhesive member is an epoxy adhesive or a silicon adhesive. The adhesive member may be a conductive adhesive or a non-conductive adhesive. The storage 20 may be adhered to the image forming apparatus 30 by an adhesive member. When the storage 20 is adhered to the image forming apparatus 30, the storage 20 may be adhered at an arbitrary position outside the image forming apparatus 30 or adhered inside a cover 30a of the image forming apparatus 30.

The image forming apparatus 30 may perform a function of printing internally stored data or data transmitted from an external device on a printing medium and outputting the printing medium. The image forming apparatus 30 may be a printer, a copy machine, a facsimile device, or a multi-functional device.

The image forming apparatus 30 may be an inkjet type image forming apparatus or an electro-photographic type image forming apparatus.

The inkjet type image forming apparatus prints a predetermined image on a printing medium by ejecting ink of minute liquid droplets to a desired position on the printing medium. Basically, the inkjet type image forming apparatus may include a print head having a nozzle for ejecting the minute liquid droplets of the ink to the desired position and a conveyor device which conveys the printing medium during printing.

The electro-photographic type image forming apparatus supplies toner to an electrostatic latent image generated by radiating light to a photosensitive body, or the like, and prints a predetermined image by transferring the electrostatic latent image to which toner is supplied onto the printing medium.

Figure 5:
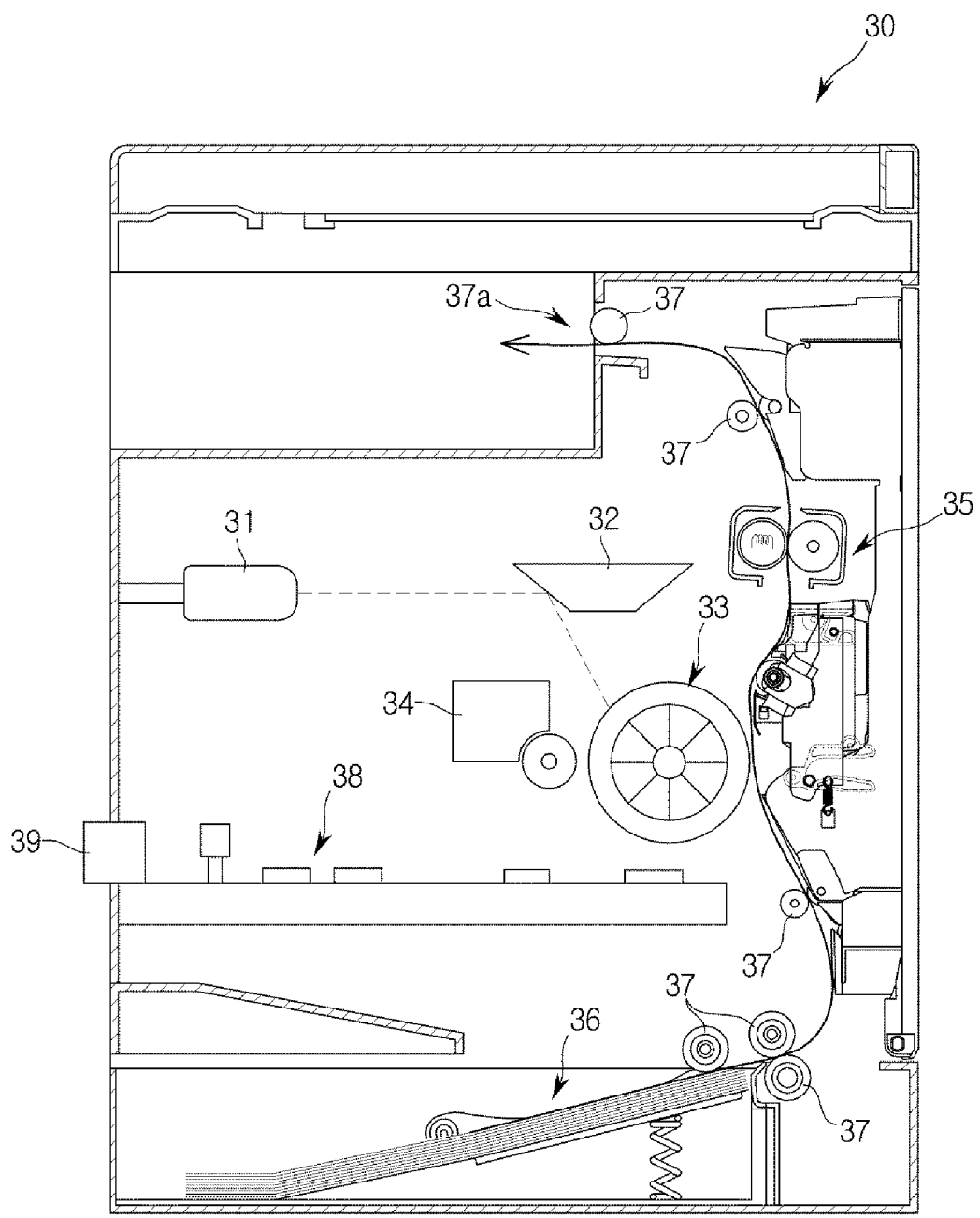
FIG. 5 is a configuration diagram illustrating an embodiment of the image forming apparatus.

FIG. 5 illustrates a laser printer as an embodiment of the image forming apparatus.

As illustrated in FIG. 5, the image forming apparatus 30 may include a light radiation unit 31 configured to radiate light such as laser, a mirror 32 configured to enable the light to reach a given position of a photosensitive body 33 charged with a predetermined potential by reflecting the light radiated by the light radiation unit 31, the photosensitive body 33 having a surface on which an electrostatic latent image is formed according to the radiated light, a toner hopper 34 configured to contain toner to be supplied to the photosensitive body 33, a fixer 35 configured to fix a visible image transferred onto a printing medium p, a printing medium tray 36 configured to contain the printing medium p, and various conveyors 37.

The light radiation unit 31, the mirror 32, the photosensitive body 33, the toner hopper 34, the fixer 35, the printing medium tray 36, and the conveyors 37 may be installed inside a predetermined housing.

The light radiation unit 31 may radiate light such as laser to the mirror 32 or the photosensitive body 33.

When predetermined light is radiated from the light radiation unit 31, the mirror 32 may cause the light to reach the photosensitive body 33 by reflecting the light according to a predetermined control signal. The mirror 32 may be a polygon prism.

The photosensitive body 33 may be charged with a predetermined surface voltage of positive (+) or negative (−) polarity before the light reaches the photosensitive body 33. When light is incident on the photosensitive body 33, a portion on which the light is incident may be varied to polarity reverse to the charged polarity, for example, negative (−) or positive (+) polarity, by reacting with the incident light. According to an embodiment, it may be varied to neutral polarity. The polarity reverse to the charged polarity may form a predetermined print pattern, that is, an electrostatic latent image, on the surface of the photosensitive body 33. The photosensitive body 33 may be a photosensitive drum.

The toner hopper 34 may supply toner to the photosensitive body 33. The toner may have the positive or negative polarity. The toner is attached to the electrostatic latent image of the photosensitive body 33 and forms a visible image on the surface of the photosensitive body 33.

The printing medium p such as paper may pass through an outside surface of the photosensitive body 33 while the printing medium p is moved by the conveyors 37. While the printing medium p passes through the outside surface of the photosensitive body 33, the visible image formed on the photosensitive body 33 may be directly transferred onto the printing medium p or transferred onto the printing medium p through an intermediate transfer body.

The fixer 35 may fix the visible image transferred onto the printing medium p to the printing medium p by heating the printing medium p onto which the visible image is transferred and pressing the toner on the printing medium p.

According to an embodiment of the image forming apparatus, at least one printing medium tray 36 may be installed inside the housing as illustrated in FIG. 5. According to another embodiment, no printing medium tray 36 may be installed in the image forming apparatus. When no printing medium tray 36 is installed in the image forming apparatus, the image forming apparatus may further include a printing medium input unit which receives the printing medium p from the user or the like.

The printing medium p on which an image is printed is conveyed through the conveyors 37 or the like, and may be externally ejected through a predetermined ejection unit 37a.

On the other hand, a main board 38 may be installed in the image forming apparatus 30. On the main board 38, a semiconductor chip and circuit and various components may be installed to generate control signals for controlling the overall operations of the above-described light radiation unit 31, mirror 32, photosensitive body 33, toner hopper 34, fixer 35, and conveyors 37, etc.

In the main board 38, a storage medium for storing various information may be installed. The storage medium may be a semiconductor memory device or a magnetic disc storage device. In addition, various storages to be used to store predetermined data may be all used as the storage medium. The storage medium may store an identification number for identifying the image forming apparatus 30, for example, a MAC address or the like. Accordingly, when the main board 38 of the image forming apparatus 30 is replaced, the identification number assigned to the image forming apparatus 30 may be changed. In addition, the storage medium may store a terminal device identification number for communicating with the terminal device 10, for example, a telephone number or an electronic mail address assigned to the terminal device. In addition, the storage medium may store various information necessary for the operation of the image forming apparatus 30.

In addition, in the main board 38, a communication module 39 for communicating with the outside may be installed. The communication module 39 may be a LAN card. The communication module 39 may include various communication chips. The communication module 39 may further include a connection port to which an antenna for wireless communication, a communication cable for wired communication, etc. may be connected. The communication module 39 may provide a function of enabling the image forming apparatus to communicate with the terminal device 10 or the storage 20. The communication module 39 may perform communication with the terminal device 10 or the storage 20 using at least one scheme of the RFID scheme, the NFC scheme, the Wi-Fi™ scheme, the Wi-Fi Direct™ scheme, and the Bluetooth™ scheme. According to an embodiment, a specific number for identifying each communication module, for example, an identification number such as a MAC address, may be assigned to a predetermined communication module. The MAC address may be stored in the storage medium of the communication module such as the memory device.

Figure 6:
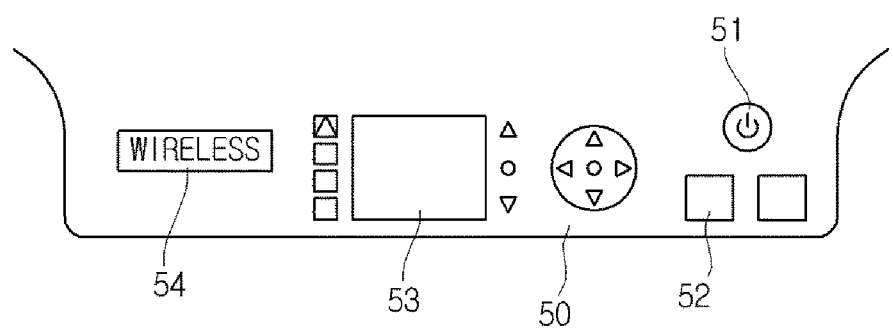
FIG. 6 is a configuration diagram illustrating an embodiment of an input unit of the image forming apparatus.

FIG. 6 is a configuration diagram illustrating an embodiment of an input unit of the image forming apparatus.

The image forming apparatus 30 may include a predetermined input unit 50 as illustrated in FIGS. 2 and 6. Referring to FIG. 6, a power button 51, function buttons 52 for various instructions such as a copy start and a print start, a display unit 53, a WPS button 54, etc. may be provided in the input unit 50 of the image forming apparatus 30.

The power button 51 may receive a command for starting the operation of the image forming apparatus 30, and the function buttons 52 may receive a command for starting, stopping, or ending a print, copy, facsimile transmission, or scan operation.

The display unit 53 may display various information about the image forming apparatus 30. According to an embodiment, the display unit 53 may display the identification number of the image forming apparatus, for example, a MAC address. The display unit 53 may be implemented as a touch screen module. When the display unit 53 is implemented as the touch screen module, the display unit 53 may receive various instructions or commands from the user. In an embodiment, the display unit 53 may display predetermined virtual buttons for receiving various instructions from the user on the screen.

The WPS button 54 may enable the image forming apparatus 30 to perform a WPS function. The WPS function is standard technology for enabling a secure wireless network to be easily configured. According to the WPS function, devices in which a Wi-Fi™ function is possible may be directly connected to each other. When the WPS button 54 is clicked, the image forming apparatus 30 may directly communicate with a predetermined peripheral terminal device 10.

According to an embodiment, the WPS button 54 may be a physical button as illustrated in FIG. 6. According to another embodiment, when the above-described display unit 53 is implemented as the touch screen module, the WPS button may be a virtual button displayed on a touch screen. The WPS function may be performed when the users operates the physical button or touching the touch screen.

Hereinafter, the information update method of the storage 20 will be described with reference to FIGS. 7 to 10 in the following embodiments.

Figure 7:
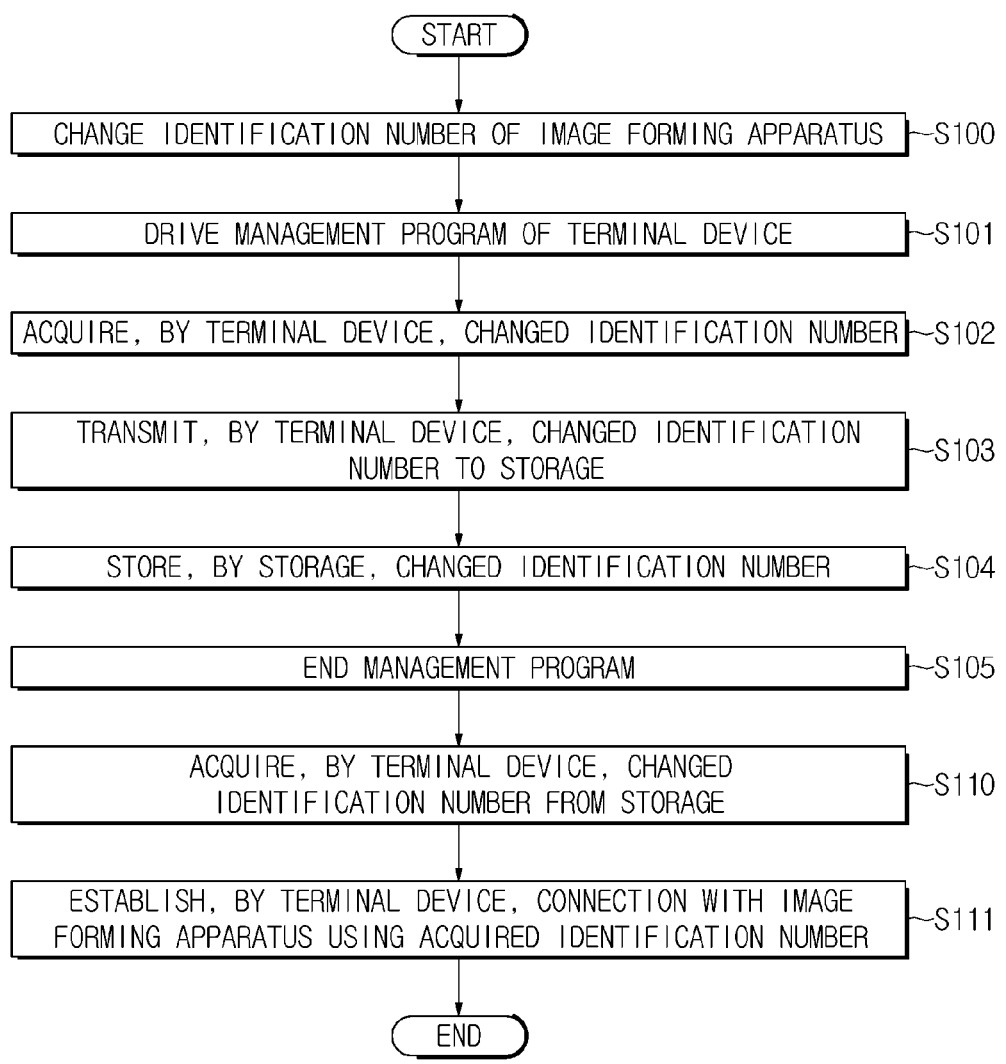
FIG. 7 is a flowchart illustrating a first embodiment of a storage information update method.

FIG. 7 is a flowchart illustrating a first embodiment of the storage information update method.

As illustrated in FIG. 7, according to the first embodiment of the storage information update method, the storage information update method may include a process of storing a changed identification number in the storage 20 using the terminal device 10 after the terminal device 10 acquires the changed identification number from the image forming apparatus 30.

The first embodiment of the storage information update method will be more specifically described.

The identification number assigned to the image forming apparatus 30 may be stored in a separate storage 20 for convenience of identification number acquisition. In an embodiment, the storage may be an electronic tag attached to the image forming apparatus 30.

On the other hand, as illustrated in FIG. 7, the identification number assigned to the image forming apparatus 30 may be changed (S100). For example, when the main board 28 of the image forming apparatus 30 or the like is replaced as described above, the identification number assigned to the image forming apparatus 30 may be changed. Alternatively, the identification number assigned to the image forming apparatus 30 may be changed on various reasons. In an embodiment, the identification number may be at least one of the MAC address and the PIN code of the image forming apparatus 30.

As described above, when the identification number of the image forming apparatus 30 is changed, the identification number of the image forming apparatus 30 stored in the storage 20 may be different from a real identification number of the image forming apparatus 30. In addition, when the storage 20 is lost and a new storage 20 is used, the identification number of the image forming apparatus 30 stored in the storage 20 may also be different from the real identification number of the image forming apparatus 30. In an embodiment, when the terminal device 10 is intended to connect to the image forming apparatus 30 by acquiring the identification number of the image forming apparatus 30 from the storage 20, the connection between the terminal device 10 and the image forming apparatus 30 may fail because the identification numbers are different.

In order to prevent the connection failure, according to the storage information update method as illustrated in FIG. 7, first, a predetermined management program of the terminal device starts to be driven so as to cause the identification number of the image forming apparatus 30 stored in the storage 20 to be consistent with the identification number assigned to the image forming apparatus 30 (S101). The driving and operation of the management program is executable in a foreground or background in an operating system (OS) of the terminal device 10. The management program may be manually or automatically driven. In order to automatically drive the management program, the terminal device 10 may receive a predetermined driving signal from the image forming apparatus 30.

Subsequently, the terminal device 10 may acquire the changed identification number of the image forming apparatus 30 through various methods (S102). Various methods in which the terminal device 10 acquires the changed identification number of the image forming apparatus 30 will be described later.

When the terminal device 10 acquires the changed identification number, the terminal device 10 may transmit the changed identification number to the storage 20 (S103). When the storage 20 is an electronic tag, the user causes the terminal device 10 to be in the vicinity of the electronic tag, thereby transmitting the changed identification number stored in the terminal device 10 to the storage.

The storage 20 may update the identification number stored in the storage 20 by storing the changed identification number transmitted from the terminal device 10 (S104). Accordingly, the identification number of the image forming apparatus 30 stored in the storage 20 may be consistent with the identification number assigned to the image forming apparatus 30.

When a process of updating the identification number stored in the storage 20 is ended, the management program of the terminal device 10 may manually or automatically end (S105).

Thereafter, when it is necessary to connect the terminal device 10 and the image forming apparatus 30, the terminal device 10 may receive and acquire at least one identification number updated through the above-described process from the storage 20 (S110). Because the identification number of the image forming apparatus 30 stored in the storage 20 as described above is consistent with the real identification number assigned to the image forming apparatus 30, the terminal device 10 may be connected to the image forming apparatus 30 using the identification number acquired from the storage 20 (S111).

Figure 8:
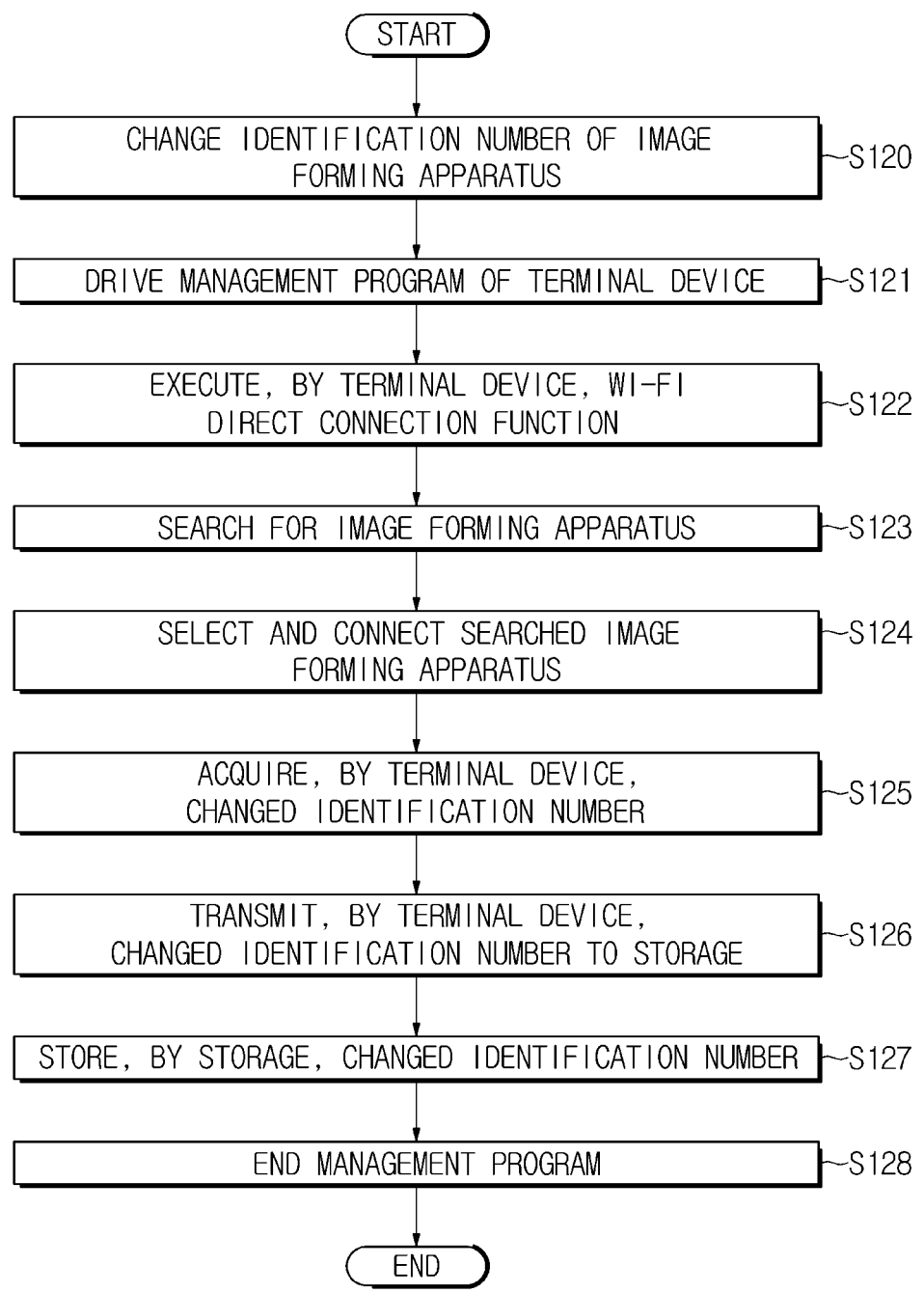
FIG. 8 is a flowchart illustrating a second embodiment of the storage information update method.

FIG. 8 is a flowchart illustrating a second embodiment of the storage information update method.

As illustrated in FIG. 8, the real identification number of the image forming apparatus 30 may be different from the identification number of the storage on various reasons (S120). According to the second embodiment of the storage information update method, the management program of the terminal device 10 starts to be automatically or manually driven as described above (S121).

Subsequently, the terminal device 10 may execute the Wi-Fi Direct™ connection function (S122) and search for the peripheral image forming apparatus 30 to be directly connected in the Wi-Fi Direct™ scheme (S123). When at least one image forming apparatus 30 is searched for as the search result, the terminal device 10 may select at least one image forming apparatus 30 manually or automatically searched for according to the user's selection. If a plurality of image forming apparatuses 30 are searched for, at least one image forming apparatus 30 may be selected from a plurality of image forming apparatuses 30 according to the user's selection. In addition, when the plurality of image forming apparatuses are searched for, the terminal device 10 may select the appropriate image forming apparatus 30 among the plurality of mage forming apparatuses after reading information about the image forming apparatuses stored in an internal or external storage medium of the terminal device 10. When at least one image forming apparatus is searched for, the terminal device 10 and the image forming apparatus 30 may be directly connected to each other. That is, the image forming apparatus 30 and the terminal device 10 may be paired (S124).

When connected to the image forming apparatus 30, the terminal device may directly receive and acquire the changed identification number from the image forming apparatus 30 S125).

When the terminal device 10 acquires the changed identification number, the terminal device 10 may transmit the changed identification number to the storage 20 as described above (S126).

The storage 20 stores the changed identification number transmitted from the terminal device 10, thereby updating the identification number of the storage 20 (S127).

When the identification number update process of the storage 20 is ended, the management program of the terminal device 10 may manually or automatically end (S128).

Thereafter, as necessary, the terminal device 10 can acquire the changed identification number from the storage 20 through the above-described process and communicate with the image forming apparatus 30 using the acquired changed identification number.

Figure 9:
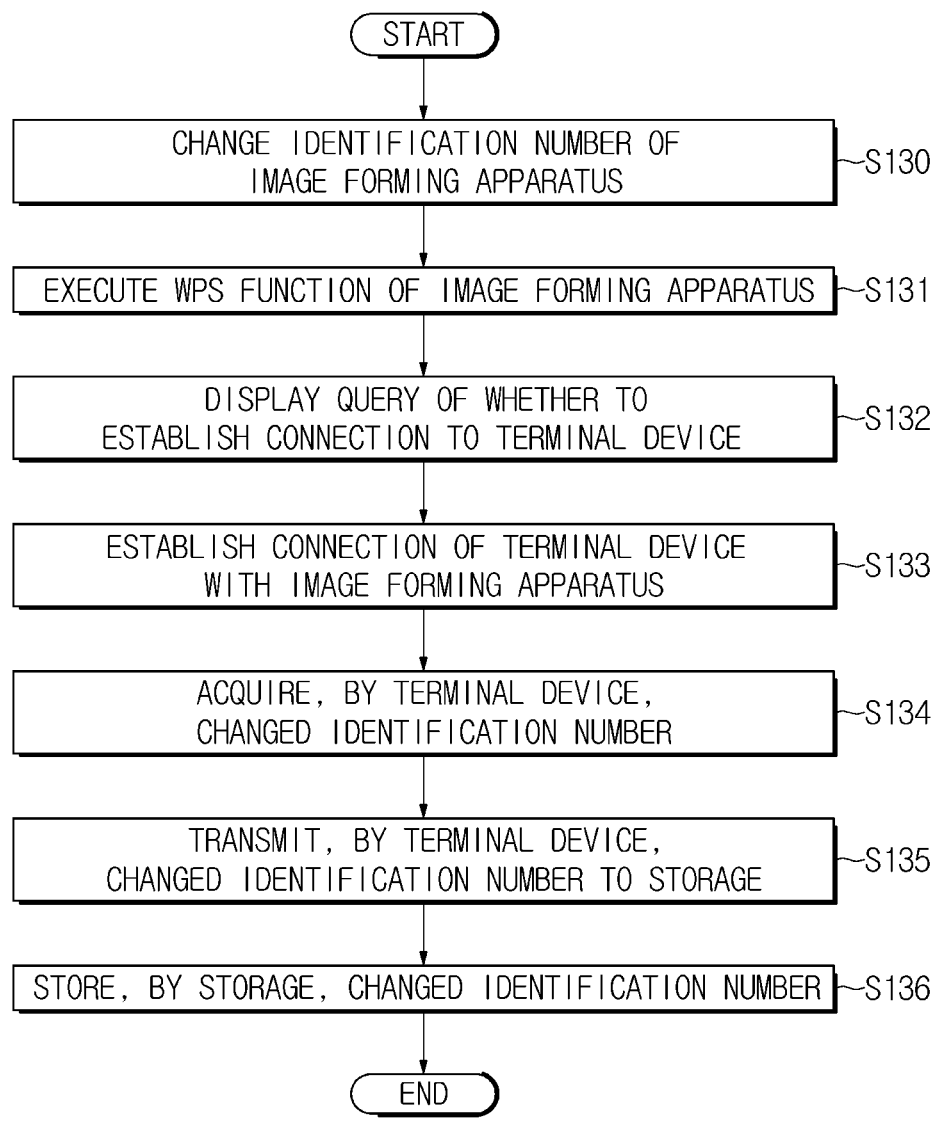
FIG. 9 is a flowchart illustrating a third embodiment of the storage information update method.

FIG. 9 is a flowchart illustrating a third embodiment of the storage information update method.

As illustrated in FIG. 9, according to the third embodiment of the storage information update method, when the real identification number of the image forming apparatus 30 is different from the identification number of the image forming apparatus stored in the storage because the identification number of the image forming apparatus 30 is changed (S130), the WPS function of the image forming apparatus 30 is first executable according to the user's operation (S131). The user operates the predetermined physical button 54 of the image forming apparatus 30 or the virtual button displayed on the touch screen, and thus the image forming apparatus 30 may execute the WPS function.

When the WPS function is executed, the image forming apparatus 30 may transmit a predetermined connection request signal to a peripheral device using predetermined electromagnetic waves. The terminal device 10 may receive the connection request signal generated from the image forming apparatus 30 and display a query of whether to establish a connection with the image forming apparatus 30 on the display unit 12 of the terminal device 10 (S132). When the user determines to establish the connection with the image forming apparatus 30, the terminal device may accept the connection request of the image forming apparatus 30. As a result, the terminal device 10 may be directly connected to the image forming apparatus 30 through a wireless communication network (S133). In other words, the image forming apparatus 30 and the terminal device 10 may be paired with each other.

When connected to the image forming apparatus 30, the terminal device may directly receive and acquire at least one identification number from the image forming apparatus 30 (S134).

When the terminal device 10 acquires the changed identification number, the terminal device 10 may transmit the changed identification number to the storage 20 as described above (S135). The storage 20 stores the changed identification number transmitted from the terminal device 10, thereby updating the identification number stored in the storage 20 (S136). As a result, the real identification number of the image forming apparatus 30 may be consistent with the identification number of the image forming apparatus 30 stored in the storage 20.

Thereafter, when it is necessary to connect the terminal device 10 and the image forming apparatus 30, the terminal device 10 can acquire the changed identification number from the storage 20 through the above-described process and communicate with the image forming apparatus 30 using the acquired changed identification number.

Figure 10:
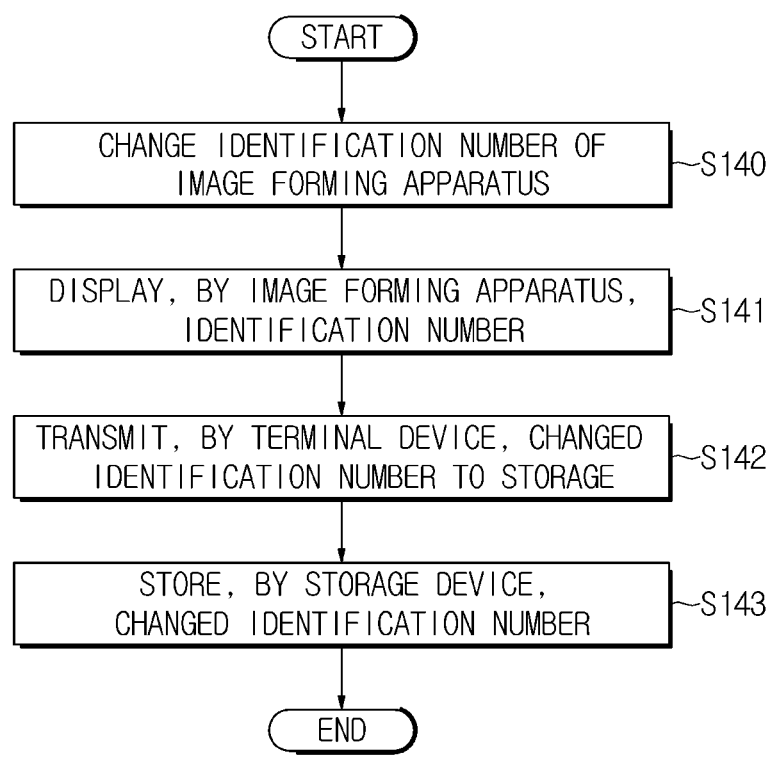
FIG. 10 is a flowchart illustrating a fourth embodiment of the storage information update method.

FIG. 10 is a flowchart illustrating a fourth embodiment of the storage information update method.

As illustrated in FIG. 10, according to the fourth embodiment of the storage information update method, when the real identification number of the image forming apparatus 30 is different from the identification number of the image forming apparatus stored in the storage because the identification number of the image forming apparatus 30 is changed (S140), the image forming apparatus 30 may display the changed identification number to the user through the display unit 53 or the like (S141). In an embodiment, the image forming apparatus 30 may display the changed identification number to the user by printing and outputting the changed identification number on a printing medium.

The user may manually input the changed identification number to the terminal device 10 through an input (input unit) of the terminal device 10, for example, a touch screen panel or various keypads (S142). Thus, the terminal device 10 may acquire the changed identification number.

When the terminal device 10 acquires the changed identification number, the terminal device 10 transmits the changed identification number to the storage 20 as described above S142) and the storage 20 may cause the identification number stored in the storage 20 to be consistent with the real identification number of the image forming apparatus 30 by storing the changed identification number transmitted from the terminal device 10 S(143).

Figure 11:
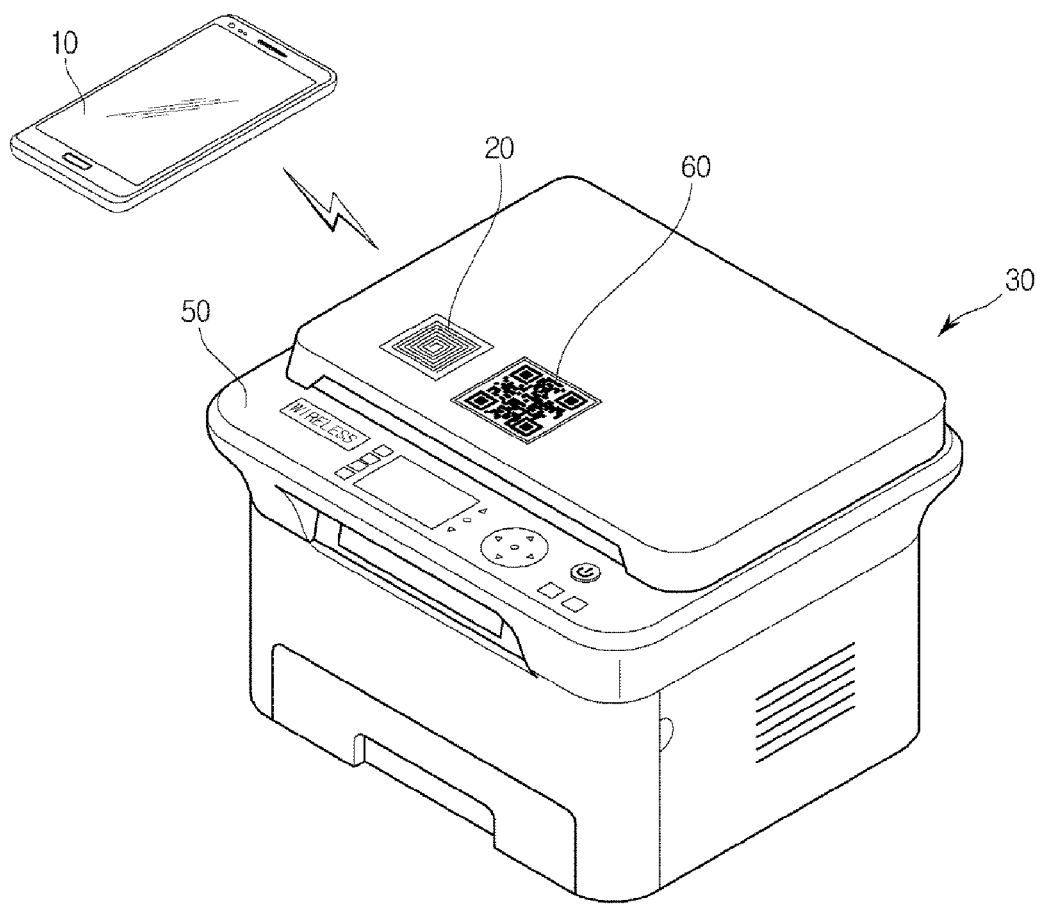
FIG. 11 is a perspective view illustrating an embodiment of the image forming apparatus.

FIG. 11 is a perspective view illustrating an embodiment of an image forming apparatus 30 having an input unit 50.

As illustrated in FIG. 11, a predetermined barcode 60 may be formed in the image forming apparatus 30. The barcode 60 may be directly printed on the outside of the housing of the image forming apparatus 30. After the barcode 60 may be printed on a separate printing medium, the printed barcode 60 may be attached to the outside of the housing of the image forming apparatus.

According to an embodiment, the barcode 60 may store information about at least one identification number of the image forming apparatus 30.

According to an embodiment, the barcode 60 may be a one-dimensional barcode. According to another embodiment, the barcode 60 may be a two-dimensional barcode, for example, a quick response (QR) code. The QR code is a matrix type of two-dimensional barcode representing information in a black and white grid pattern. When the two-dimensional barcode is used, an amount of information which is larger than that of the one-dimensional barcode may be stored.

Figure 12:
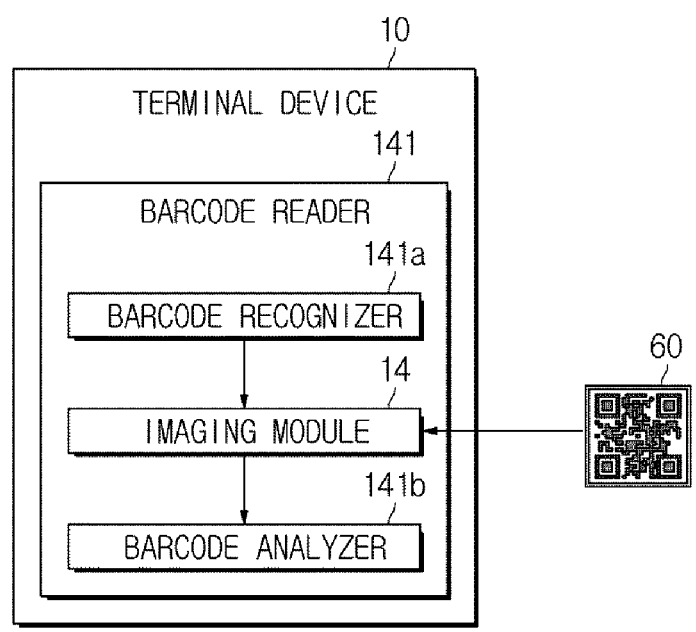
FIG. 12 is a configuration diagram illustrating an embodiment of the terminal device.

FIG. 12 is a configuration diagram illustrating an embodiment of the terminal device.

When the predetermined barcode 60 is formed on the image forming apparatus 30, the terminal device 10 may include a barcode reader 141. The barcode reader 141 may include an imaging module 14 for imaging the barcode 60, a barcode recognizer 141a for recognizing the barcode 60 from video data collected by the imaging module 14, and a barcode analyzer 141b for analyzing and reading the recognized barcode 60.

As the imaging module 14, a general imaging module installed in the terminal device 10 may be used. Specifically, the imaging module 14 may include a lens and a CCD.

The barcode recognizer 141a may recognize whether the barcode 60 is in the video data collected by the imaging module and recognize a position in an image of the barcode 60, a barcode direction, etc. The barcode recognizer 141a may be implemented using a CPU and a GPU formed in the terminal device 10.

The barcode analyzer 141b may read at least one identification number of the image forming apparatus 30 stored in the barcode 60 by analyzing and reading the recognized barcode 60.

Figure 13:
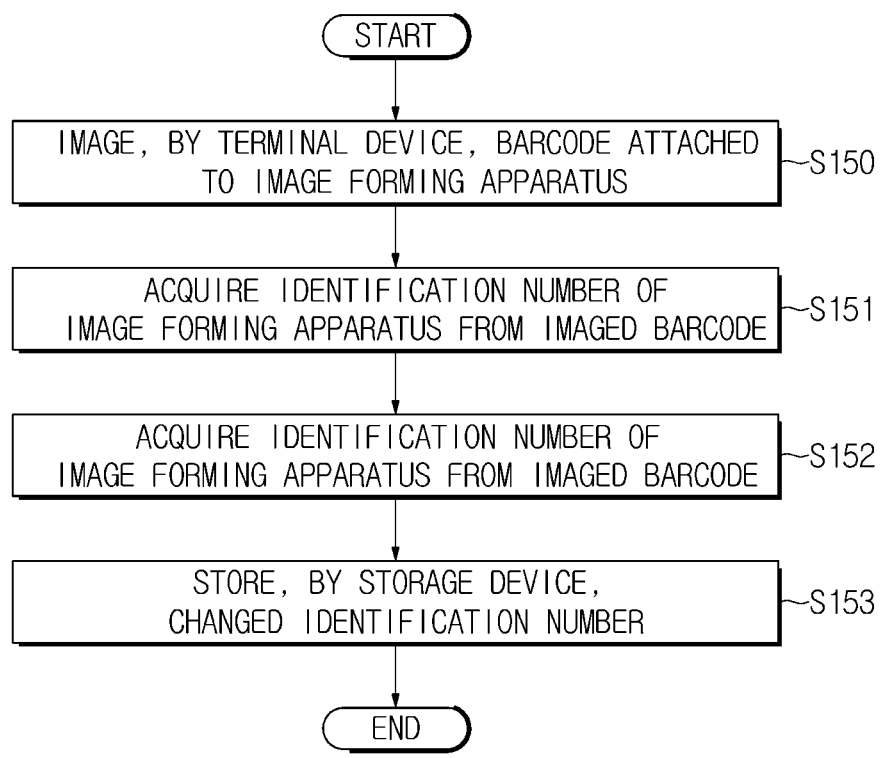
FIG. 13 is a flowchart illustrating a fifth embodiment of the storage information update method.

FIG. 13 is a flowchart illustrating a fifth embodiment of the storage information update method.

According to the fifth embodiment of the storage information update method, when the barcode 60 is formed on the image forming apparatus 30 as described above, the terminal device 10 may first image the barcode attached to the image forming apparatus using the imaging module 14 (S150). The terminal device 10 may acquire at least one identification number of the image forming apparatus 30 from the imaged barcode (S151). When the terminal device 10 acquires a changed identification number, the terminal device 10 may transmit the changed identification number to the storage 20 as described above (S152) and the storage 20 stores the changed identification number transmitted from the terminal device 10, thereby causing the identification number stored in the storage 20 to be consistent with the real identification number of the image forming apparatus 30 (S153).

Figure 14:
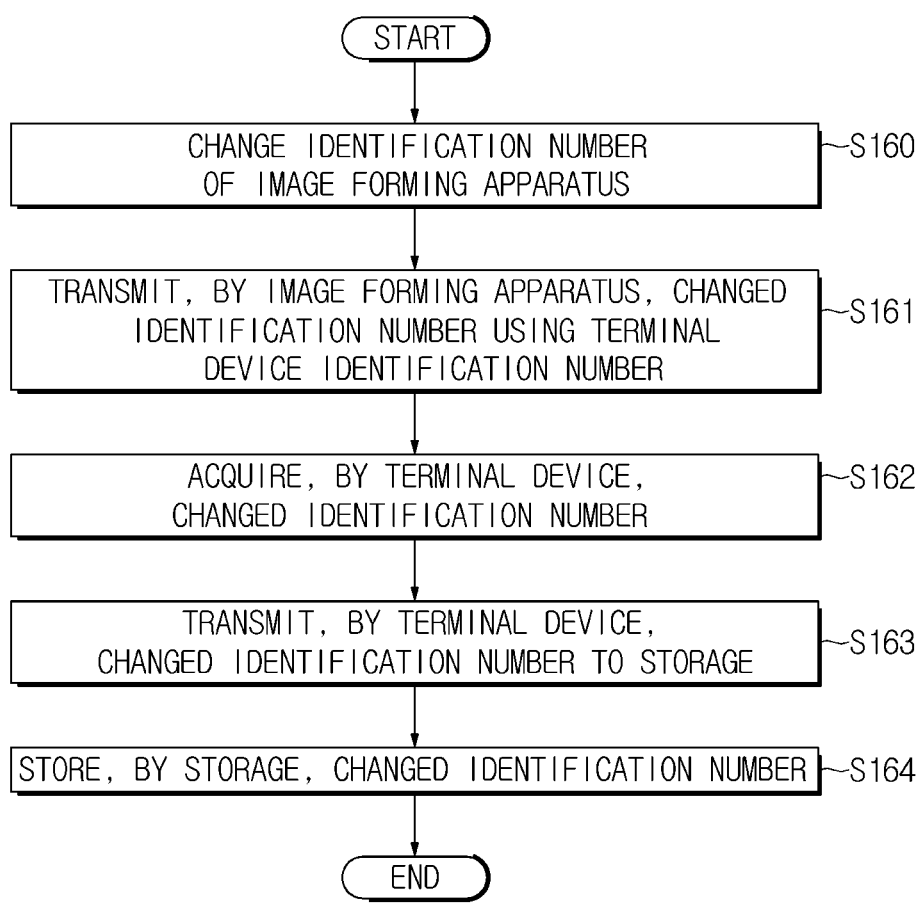
FIG. 14 is a flowchart illustrating a sixth embodiment of the storage information update method.

FIG. 14 is a flowchart illustrating a sixth embodiment of the storage information update method.

As illustrated in FIG. 14, according to the sixth embodiment of the storage information update method, when the real identification number of the image forming apparatus 30 is different from the identification number of the image forming apparatus stored in the storage because the identification number of the image forming apparatus 30 is changed (S160), the image forming apparatus 30 may transmit the changed identification number to the terminal device 10 using a terminal device identification number (S161). The image forming apparatus 30 may transmit the changed identification number to the terminal device 10 using the terminal device identification number automatically or according to the user's manual operation. In an embodiment, the terminal device identification number may be a predetermined identification number assigned to the terminal device 10, for example, a telephone number or an electronic mail address assigned to the terminal device 10.

In an embodiment, according to an embodiment, the image forming apparatus 30 may transmit the changed identification number to the terminal device 10 using a messaging system, for example, a short messaging service (SMS) system or a multimedia messaging service (MMS) system. When the SMS or MMS system is used, a telephone number or an electronic mail address may be used as the terminal device identification number.

In addition, the image forming apparatus 30 may transmit the changed identification number to a mail server using the electronic mail address, and the terminal device 10 may receive the changed identification number by connecting to the mail server. As a result, the terminal device 10 may acquire the changed identification number from the image forming apparatus 30 (S162).

When the terminal device 10 acquires the changed identification number, the terminal device 10 may transmit the changed identification number to the storage 20 (S163) and the storage 20 stores the changed identification number transmitted from the terminal device 10, thereby causing the identification number of the image forming apparatus 30 stored in the storage 20 to be consistent with the real identification number of the image forming apparatus 30 (S164).

When it is necessary to connect the terminal device 10 and the image forming apparatus 30 after the above-described process is completed, the user operates the terminal device 10 and the terminal device 10 acquires the changed identification number from the storage 20, thereby communicating with the image forming apparatus 30 using the changed identification number.

Figure 15:
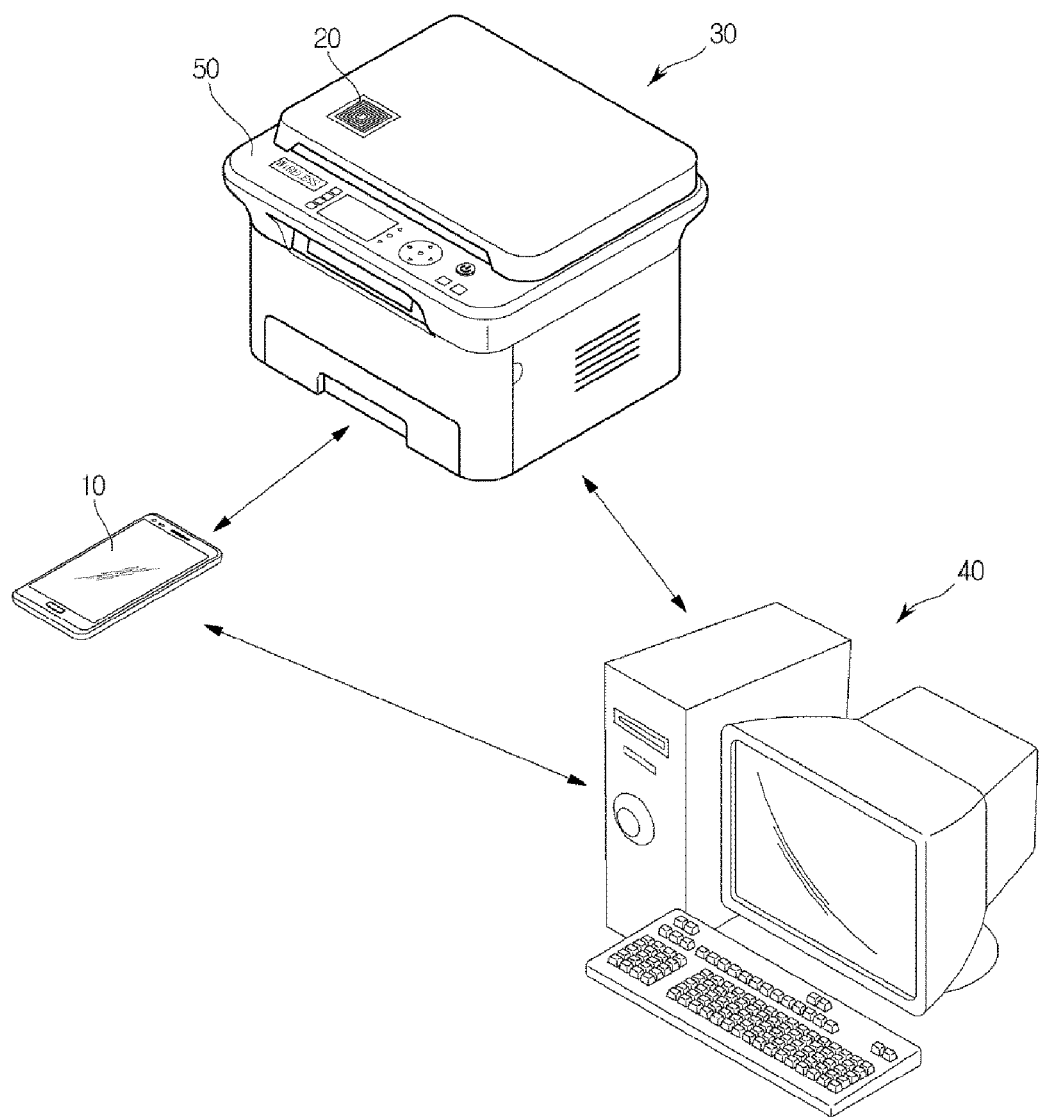
FIG. 15 is a diagram illustrating another embodiment of the system for managing the image forming apparatus.

FIG. 15 is a diagram illustrating another embodiment of the system for managing the image forming apparatus. As illustrated in FIGS. 1 and 15, the system may further include an information processing apparatus 40.

The information processing apparatus 40 may be connected to at least one of the terminal device 10 and the image forming apparatus 30 through a wired/wireless communication network. The information processing apparatus 40 may collect at least one identification number assigned to the image forming apparatus 30 by connecting to the image forming apparatus 30 and store the collected at least one identification number in a storage medium of the information processing apparatus 40. The information processing apparatus 40, for example, may be a notebook computer, a desktop computer, a tablet PC, or the like. The information processing apparatus 40 may be a server device.

The information processing apparatus 40 may be directly connected to the image forming apparatus 30 through a cable and connected to the image forming apparatus 30 through a predetermined wired or wireless network. The image forming apparatus 30 has an input unit 50.

Figure 16:
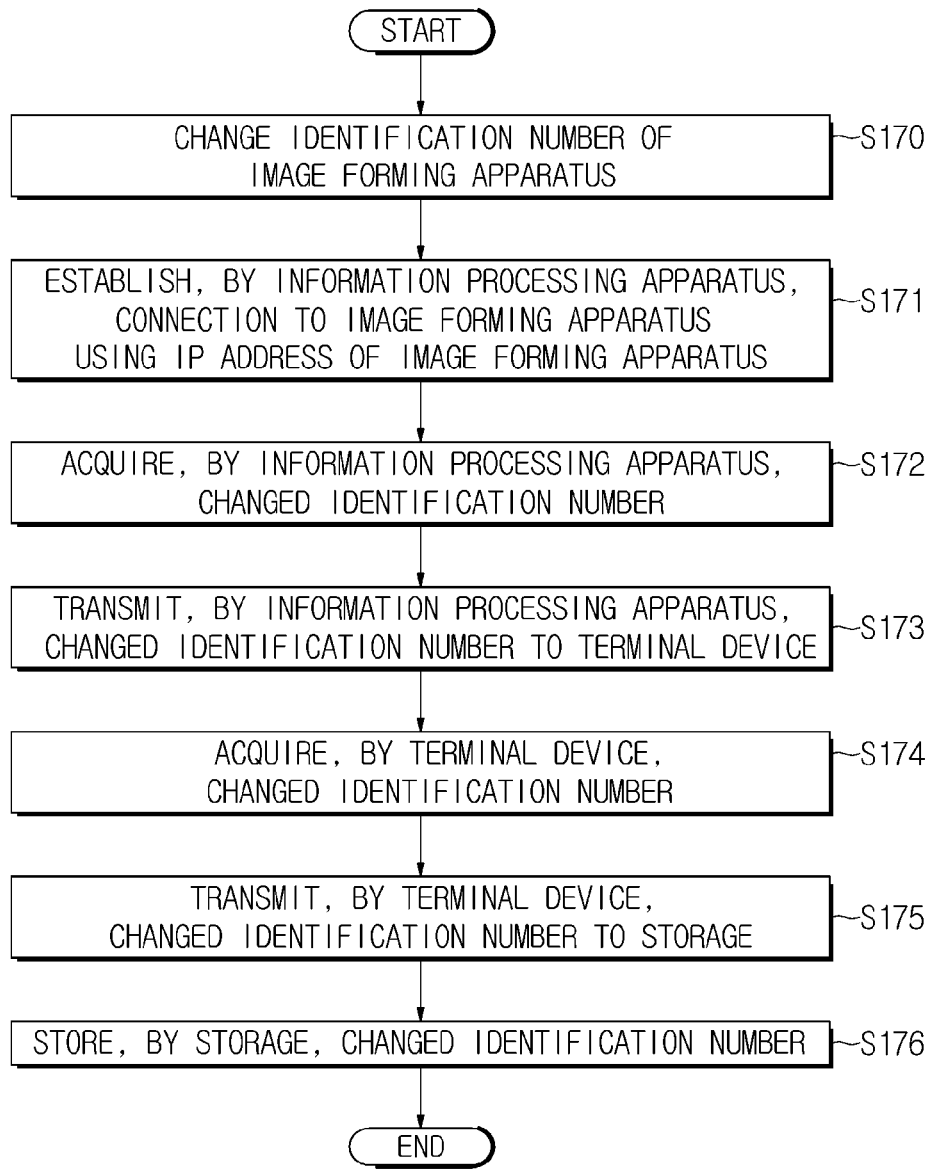
FIG. 16 is a flowchart illustrating a seventh embodiment of the storage information update method.

FIG. 16 is a flowchart illustrating a seventh embodiment of the storage information update method.

The storage information update method according to the seventh embodiment may be implemented by the system for managing the image forming apparatus, wherein the system includes the information processing apparatus 40 When the identification number of the image forming apparatus 30 is changed according to replacement of the main board or the like and the real identification number of the image forming apparatus 30 is different from the identification number of the image forming apparatus 30 stored in the storage 20 (S170), the information processing apparatus 40 may be connected to the image forming apparatus 30 using an identifier such as an IP address of the image forming apparatus 30 (S171). In an embodiment, after driving a web browser program, the information processing apparatus 40 may be connected to the image forming apparatus 30 by inputting the IP address of the image forming apparatus 30 to an address input window of the web browser program.

The image forming apparatus 30 may transmit the identification number of the image forming apparatus, for example, information about a changed identification number, to the information processing apparatus 40 according to a connection of the information processing apparatus 40, and the information processing apparatus 40 may acquire the identification number for the image forming apparatus 30 by temporarily or permanently storing information about the changed identification number (S172).

According to another embodiment, the information processing apparatus 40 may acquire the changed identification number for the image forming apparatus 30 from a device driver for managing the image forming apparatus 30.

The information processing apparatus 40 may transmit the changed identification number acquired from the image forming apparatus 30 to the terminal device 10 (S173). According to an embodiment, the information processing apparatus 40 may directly transmit the changed identification number to the terminal device 10 and transmit the changed identification number to the terminal device 10 using a messaging system or an electronic mail system. When the messaging system or the mail server is used, the information processing apparatus 40 may store the terminal device identification number for identifying the terminal device 10, for example, a telephone number, an electronic mail address, or the like.

The terminal device 10 may acquire the changed identification number from the information processing apparatus 40 through the above-described method (S174).

As described above, the terminal device 10 may transmit the changed identification number to the storage 20 using the NFC scheme or the like (S175).

The storage 20 may cause the identification number stored in the storage 20 to be consistent with the real identification number of the image forming apparatus 30 (S176).

Figure 17:
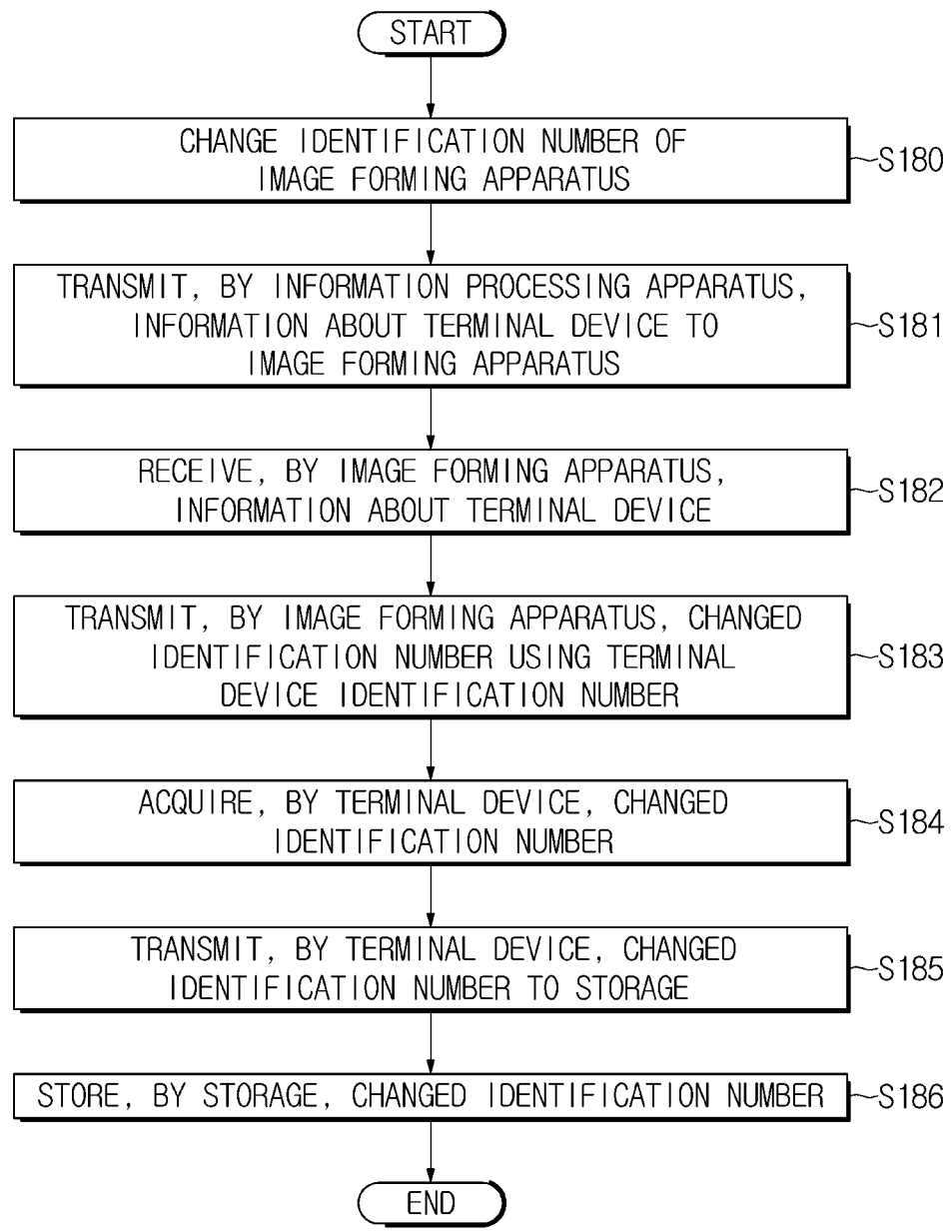
FIG. 17 is a flowchart illustrating an eighth embodiment of the storage information update method.

FIG. 17 is a flowchart illustrating an eighth embodiment of the storage information update method.

According to the eighth embodiment of the storage information update method illustrated in FIG. 17, when the real identification number of the image forming apparatus 30 is different from the identification number of the image forming apparatus 30 stored in the storage 20 because the identification number of the image forming apparatus 30 is changed or the storage 20 is replaced (S180), the information processing apparatus 40 may transmit information about the terminal device 10, for example, a terminal device identification number, to the image forming apparatus 30 (S181). Then, the image forming apparatus 30 may receive the terminal device identification number for the terminal device 10 (S182), temporarily or permanently store the received terminal device identification number in a separate storage medium, and transmit the changed identification number to the terminal device 10 using the received terminal device identification number (S183). In an embodiment, the image forming apparatus 30 may transmit the changed identification number to the terminal device 10 using the messaging system. In addition, the image forming apparatus 30 may transmit the changed identification number to the terminal device 10 using the electronic mail system.

The terminal device 10 may acquire the identification number from the image forming apparatus 30 (S184) and transmit the acquired identification number to the storage 20 (S185). By storing the transmitted identification number, the storage 20 causes the real identification number of the image forming apparatus 30 to be consistent with the identification number of the image forming apparatus 30 stored in the storage 20 (S186).

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A system for managing an image forming apparatus, comprising:
    the image forming apparatus to which at least one identification number is assigned;
    a storage configured to store an identification number of the image forming apparatus; and
    a terminal device configured to receive at least one identification number from the image forming apparatus when the identification number assigned to the image forming apparatus is changed and transmit the received at least one identification number to the storage,
    wherein the storage includes an electronic tag on the image forming apparatus.

2. The system according to claim 1, wherein the terminal device is connectable to at least one of the imaging forming apparatus and the storage through at least one communication network.

3. The system according to claim 2, wherein the at least one communication network is a wireless communication network, which uses at least one scheme of a radio frequency (RF) identifier (RFID) scheme, a near field communication (NFC) scheme, a wireless fidelity (Wi-Fi™) scheme, a Wi-Fi Direct™ scheme, and a Bluetooth™ scheme.

4. The system according to claim 1, wherein the at least one identification number includes at least one of a media access control (MAC) address, an Internet protocol (IP) address, and a personal identification number (PIN) code of the image forming apparatus.

5. The system according to claim 1, wherein the terminal device includes an electronic tag reader configured to read information stored in the electronic tag.

6. The system according to claim 1, wherein the terminal device receives at least one identification number from the storage and communicates with the image forming apparatus using the received at least one identification number.

7. The system according to claim 1, wherein at least one of the terminal device and the storage generates an RF field for performing communication between the storage and the terminal device.

8. The system according to claim 1, wherein the terminal device searches for at least one image forming apparatus using a wireless communication network and determines whether to connect to the at least one searched image forming apparatus using at least one identification number of the searched at least one image forming apparatus.

9. The system according to claim 1, wherein the terminal device is one of a cellular phone, a smartphone, a tablet personal computer (PC), a notebook computer, a personal computer (PC), and a personal digital assistant (PDA).

10. The system according to claim 1, wherein:
    the image forming apparatus sends a connection request to the terminal device; and
    the image forming apparatus transmits the at least one identification number to the terminal device when the terminal device accepts the connection request of the image forming apparatus.

11. The system according to claim 1, wherein:
    the image forming apparatus includes a display configured to display the at least one identification number; and
    the terminal device receives the at least one identification number of the image forming apparatus.

12. The system according to claim 1, wherein the image forming apparatus prints the at least one identification number.

13. The system according to claim 1, further comprising:
an information processing apparatus connected to the image forming apparatus through a wired communication network or a wireless communication network and configured to store at least one identification number assigned to the image forming apparatus.

14. The system according to claim 13, wherein the information processing apparatus transmits at least one identification number to the terminal device using a terminal device identification number for identifying the terminal device.

15. The system according to claim 14, wherein the terminal device identification number is a telephone number or an electronic mail address assigned to the terminal device.

16. The system according to claim 13, wherein the information processing apparatus is connected to the image forming apparatus using an Internet protocol (IP) address of the image forming apparatus.

17. The system according to claim 1, wherein the image forming apparatus receives a terminal device identification number to identify the terminal device from at least one information processing apparatus connected to the image forming apparatus and transmits the at least one identification number to the terminal device using the terminal device identification number.

18. The system according to claim 1, wherein the terminal device includes a barcode reader configured to read a one-dimensional barcode or a two-dimensional barcode.

19. The system according to claim 18, wherein the one-dimensional bar code or two-dimensional barcode stores information about the at least one identification number.

20. The system according to claim 1, wherein the image forming apparatus includes a wireless fidelity (Wi-Fi)™ protected setup (WPS) input unit.

21. The system according to claim 20, wherein the WPS input unit is a physical button or a touch screen module formed on the image forming apparatus.

22. The system according to claim 1, further comprising:
a server device configured to receive the at least one identification number and transmit the received at least one identification number to the terminal device.

23. A mobile device comprising:
an input unit configured to receive at least one identification number from an image forming apparatus when at least one identification number of the image forming apparatus is changed; and
a communicator configured to transmit the at least one identification number to an electronic tag capable of storing the identification number of the image forming apparatus,
wherein the electronic tag is on the image forming apparatus.

24. The mobile device according to claim 23, wherein the input unit receives the at least one identification number using a wired communication network or a wireless communication network.

25. A storage information update method to be performed by an image forming apparatus to which at least one identification number is assigned, a storage configured to store the identification number of the image forming apparatus, and a terminal device configured to communicate with the storage, the method comprising:
acquiring, by the terminal device, the at least one identification number of the image forming apparatus from the image forming apparatus; and
transmitting, by the terminal device, the received at least one identification number to the storage,
wherein the storage includes an electronic tag on the image forming apparatus.

26. The storage information update method according to claim 25, wherein the terminal device is connectable to at least one of the imaging forming apparatus and the storage through at least one communication network.

27. The storage information update method according to claim 26, wherein the at least one communication network comprising a wireless communication network using at least one scheme of a radio frequency (RF) identifier (RFID) scheme, a near field communication (NFC) scheme, a wireless fidelity (Wi-Fi)™scheme, a Wi-Fi Direct™ scheme, and a Bluetooth™ scheme.

28. The storage information update method according to claim 25, wherein the at least one identification number includes at least one of a media access control (MAC) address, an Internet protocol (IP) address, and a personal identification (PIN) code of the image forming apparatus.

29. The storage information update method according to claim 25, further comprising:
reading, by the terminal device, at least one identification number stored in the electronic tag and communicating with the image forming apparatus using the read at least one identification number.

30. The storage information update method according to claim 25, wherein the transmitting includes:
generating, by at least one of the terminal device and the storage, a radio frequency (RF) field and transmitting the received at least one identification number to the storage using the RF field.

31. The storage information update method according to claim 25, wherein the acquiring includes:
searching, by the terminal device, for at least one image forming apparatus using a wireless communication network;
determining, by the terminal device, whether to connect to the searched image forming apparatus using at least one identification number of the searched at least one image forming apparatus; and
acquiring, by the terminal device, at least one identification number of the image forming apparatus according to the determination.

32. The storage information update method according to claim 25, wherein the acquiring includes:
transmitting, by the image forming apparatus, a connection request signal to the terminal device;
accepting, by the terminal device, a connection request;
pairing the image forming apparatus and the terminal device; and
transmitting, by the image forming apparatus, the at least one identification number to the terminal device.

33. The storage information update method according to claim 25, wherein the acquiring includes:
displaying, by the image forming apparatus, the at least one identification number; and
receiving, by the terminal device, the at least one identification number of the image forming apparatus.

34. The storage information update method according to claim 25, wherein the acquiring includes:
printing, by the image forming apparatus, the at least one identification number; and
receiving, by the terminal device, the at least one identification number of the image forming apparatus.

35. The storage information update method according to claim 25, wherein:

the image forming apparatus includes a storage unit configured to store a terminal device identification number for identifying the terminal device, and the acquiring includes transmitting, by the image forming apparatus, the at least one identification number to the terminal device using the terminal device identification number.

36. The storage information update method according to claim 25, wherein the acquiring includes reading, by the terminal device, a one-dimensional barcode or two-dimensional barcode in which information about the at least one identification number is stored.

37. The storage information update method according to claim 25, wherein the acquiring includes:

receiving, by a Wi-Fi™ protected setup (WPS) input unit formed in the image forming apparatus, an operation start command;

recognizing, by the image forming apparatus, the terminal device according to the operation start command; and transmitting, by the image forming apparatus, at least one identification number to the terminal device.

38. The storage information update method according to claim 37, wherein the WPS input unit is a physical button or a touch screen module formed on the image forming apparatus.

39. A storage information update method to be performed by an image forming apparatus to which at least one identification number is assigned, a storage configured to store the at least one identification number of the image forming apparatus, a terminal device configured to communicate with the storage, and an information processing apparatus connected to the image forming apparatus through a wired communication network or a wireless communication network, the storage information updating method comprising:

acquiring, by the information processing apparatus, the at least one identification number of the image forming apparatus when the at least one identification number is changed;

transmitting, by the information processing apparatus, the at least one identification number to the terminal device; and transmitting, by the terminal device, the received at least one identification number to the storage, wherein the storage includes an electronic tag on the image forming apparatus.

40. The storage information update method according to claim 39, wherein transmitting, by the information processing apparatus, the at least one identification number to the terminal device includes transmitting, by the information processing apparatus, the at least one identification number to the terminal device using a terminal device identification number for identifying the terminal device.

41. The storage information update method according to claim 40, wherein the terminal device identification number is a telephone number or an electronic mail address assigned to the terminal device.

42. The storage information update method according to claim 39, wherein the acquiring includes:

establishing, by the information processing apparatus, a connection to the image forming apparatus using an Internet protocol (IP) address of the image forming apparatus; and acquiring the at least one identification number of the image forming apparatus from the connected image forming apparatus.

43. An image forming apparatus comprising:

a housing;

a first storage unit installed on the outside of the housing and configured to store at least one identification number of the image forming apparatus; and a second storage unit installed inside the housing and configured to store at least one identification number of the image forming apparatus, wherein, when the at least one identification number stored in the first storage unit is different from the at least one identification number assigned to the image forming apparatus stored in the second storage unit, the at least one identification number stored in the first storage unit is caused to be consistent with the at least one identification number assigned to the image forming apparatus stored in the second storage unit through at least one terminal device, and wherein, when the at least one identification number stored in the first storage unit is different from the at least one identification number assigned to the image forming apparatus stored in the second storage unit, the at least one terminal device updates the at least one identification number stored in the first storage unit by delivering the at least one identification number received from the image forming device, stored in advance, or stored in the second storage unit received through an input unit included in the at least one terminal device to the first storage unit.

44. The image forming apparatus according to claim 43, wherein the at least one identification number includes at least one of a medium access control layer (MAC) address, an internet protocol (IP) address, and a personal identification (PIN) code of the image forming apparatus.

45. The image forming apparatus according to claim 43, wherein:

the first storage unit includes an electronic tag attachable outside the housing, and the at least one terminal device transmits data to the electronic tag through a wired or wireless communication network.

46. The image forming apparatus according to claim 43, wherein the second storage unit includes a storage medium installed in a main board or a communication module of the image forming apparatus.

47. The image forming apparatus according to claim 43, wherein the at least one terminal device is connectable to at least one of the first storage unit and the second storage unit through at least one communication network.

48. The image forming apparatus according to claim 43, further comprising:

a communicator connected to the at least one terminal device through at least one communication network.

49. The image forming apparatus according to claim 48, wherein, when the identification number of the image forming apparatus is changed, the communicator transmits the at least one identification number to the terminal device or a server device.

50. The image forming apparatus according to claim 48, wherein the communicator transmits at least one identification number to the terminal device using a terminal device identification number for identifying the terminal device.

51. The image forming apparatus according to claim 43, further comprising at least one of:

a display unit configured to display the at least one identification number;

a print unit configured to print the at least one identification number; and a Wi-Fi™ protected setup (WPS) input unit which is a physical button or a touch screen module formed in the image forming apparatus.

52. An image forming apparatus comprising:

a housing;

a first storage unit installed on the outside of the housing and configured to store at least one identification number of the image forming apparatus;

a second storage unit installed inside the housing and configured to store at least one identification number of the image forming apparatus, wherein, when the at least one identification number stored in the first storage unit is different from the at least one identification number assigned to the image forming apparatus stored in the second storage unit, the at least one identification number stored in the first storage unit is caused to be consistent with the at least one identification number assigned to the image forming apparatus stored in the second storage unit through at least one terminal device; and a barcode unit configured to store information about the at least one identification number, wherein the at least one terminal device delivers the information about the at least one identification number acquired from the barcode unit to the first storage unit and updates the at least one identification number stored in the first storage unit.

53. The image forming apparatus according to claim 43, wherein the terminal device includes at least one of a cellular phone, a tablet personal computer (PC), a notebook computer, a personal computer (PC), and a personal digital assistant (PDA).

* * * * *